(12) United States Patent
Tanaka

(10) Patent No.: US 8,874,664 B2
(45) Date of Patent: Oct. 28, 2014

(54) E-MAIL RECEIVING DEVICE, NETWORK SERVER, AND EXPIRATION MANAGEMENT METHOD FOR RECEIVED E-MAIL

(75) Inventor: Satoshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 358 days.

(21) Appl. No.: 12/920,767

(22) PCT Filed: Mar. 2, 2009

(86) PCT No.: PCT/JP2009/054348
§ 371 (c)(1),
(2), (4) Date: Sep. 2, 2010

(87) PCT Pub. No.: WO2009/110619
PCT Pub. Date: Sep. 11, 2009

(65) Prior Publication Data
US 2011/0016191 A1    Jan. 20, 2011

(30) Foreign Application Priority Data
Mar. 7, 2008    (JP) .................................. 2008-058347

(51) Int. Cl.
*G06F 15/16* (2006.01)
*H04L 12/58* (2006.01)

(52) U.S. Cl.
CPC ..................................... *H04L 12/58* (2013.01)
USPC ......................................... 709/206; 709/207

(58) Field of Classification Search
USPC ....................................................... 709/206
See application file for complete search history.

(56) References Cited

U.S. PATENT DOCUMENTS

| | | | | |
|---|---|---|---|---|
| 6,651,087 B1* | 11/2003 | Dennis | .......................... | 709/206 |
| 6,760,753 B1* | 7/2004 | Ohgushi et al. | ............... | 709/206 |
| 7,089,287 B2* | 8/2006 | Bellotti et al. | ................ | 709/206 |
| 2005/0108336 A1* | 5/2005 | Naick et al. | .................... | 709/206 |
| 2006/0248155 A1* | 11/2006 | Bondarenko et al. | ......... | 709/206 |
| 2007/0168430 A1* | 7/2007 | Brun et al. | ..................... | 709/206 |
| 2008/0133571 A1* | 6/2008 | O'Sullivan et al. | ........... | 707/102 |

FOREIGN PATENT DOCUMENTS

| | | | |
|---|---|---|---|
| JP | 7-162452 | A | 6/1995 |
| JP | 7-183912 | A | 7/1995 |
| JP | 2002-49564 | A | 2/2002 |
| JP | 2002049564 | A | 2/2002 |
| JP | 2002366492 | A * | 12/2002 |
| JP | 2006-190082 | A | 7/2006 |
| JP | 2006190082 | A | 7/2006 |
| JP | 2006311344 | A | 11/2006 |
| JP | 2007249915 | A | 9/2007 |

OTHER PUBLICATIONS

International Search Report for PCT/JP2009/054348 mailed Jun. 16, 2009.

(Continued)

*Primary Examiner* — Melvin H Pollack
(74) *Attorney, Agent, or Firm* — Sughrue Mion, PLLC

(57) ABSTRACT

A mail receiver includes: a mail receiving unit that receives a mail to which an attached file and a reference time limit of the attached file are appended; a monitoring unit that monitors whether the attached file was referred to by a user; and a warning unit that warns the user of one which the reference time limit is approaching among a non-referenced attached file.

Therefore it can manage time limits regarding a received mail more certainly.

15 Claims, 20 Drawing Sheets

(56) References Cited

OTHER PUBLICATIONS

Canadian Office Action for CA 2,717,342 dated on Apr. 8, 2013.

Chinese Office Action for CN 200980108008.7 issued on Apr. 19, 2013 with English Translation.

Chinese Office Action for CN Application No. 200980108008.7 issued on Sep. 2, 2013 with English Translation.

* cited by examiner

E-MAIL RECEIVING DEVICE, NETWORK SERVER, AND EXPIRATION MANAGEMENT METHOD FOR RECEIVED E-MAIL

This application is the National Phase of PCT/JP2009/054348, filed Mar. 2, 2009, which is based upon and claims the benefit of priority from Japanese Patent Application No. 2008-058347, filed on Mar. 7, 2008, the disclosure of which is incorporated herein in its entirety by reference.

TECHNICAL FIELD

The present invention relates to a mail receiver, a network server and a time limit management method of a received mail. In particular, the present invention relates to a mail receiver, a network server and a time limit management method of a received mail for improving a certainty of information communication and conveniences.

BACKGROUND ART

In an e-mail system, a mail receiver sorts incoming mails according to the transmission time and date and the reception time and date, and displays them to a recipient. A recipient generally opens mails in a display order and refers them. Because of this, there is a possibility for a mail to be left over without opening by a receiver depending on where the mail is located in a display order, or to be put off for the circumstances of a receiver when the number of received mails is large. In these cases, there is a possibility that the information, which a sender aims to notify by a certain time limit, cannot be notified by this time limit. On this account, there is a fear which the effectiveness of the information, which a mail has, is lost. Even if a mail is opened, a recipient cannot find a sender's expectation about time limits for opening and referencing of the mail until a recipient open the whole part and read the whole length. On this account, the recipient needs to open the whole part of a mail and refers to it for getting the intention of a sender on the time limit for opening of this mail, and this process will cause a heavy burdens to a recipient.

E-mail systems, which handle this problem, are disclosed by Japanese Patent Application Laid-Open H7-162452 and Japanese Patent Application Laid-Open H7-183912. An e-mail system disclosed by Japanese Patent Application Laid-Open H7-162452 includes a mail transmitter which adds a time limit for opening to a mail and transmits, and a mail receiver which receives a mail from the mail transmitter. A mail receiver refers to a time limit for opening which was added to the received mail from the mail transmitter, and sorts the received mails, which are left non-opened, in the order that the one which a time limit for opening has passed is placed prior to the one which a time limit for opening is approaching, and displays them in the order. Also, the mail receiver displays alarms for distinguishing the mails which a time limit for opening has passed and the mails which a time limit for opening is approaching. By this, a recipient can open and refer a received mail while taking into account the priority.

An e-mail system disclosed by Japanese Patent Application Laid-Open H7-183912 provides a mail transmitter which adds the reply necessity of a recipient with a time limit for opening to a mail and transmits, and a mail receiver which receives the mail from the mail transmitter. A mail receiver refers to a time limit for opening and the reply necessity added to a received mail from the mail transmitter. A receiver detects a non-opened mail which a time limit for opening has passed or a mail which a time limit for opening has passed although requiring reply, and notifies a sender (a mail transmitter) of that effect.

By this, a mail sender can know that a recipient is leaving a mail without opening or without a reply which is necessary.

DISCLOSURE OF INVENTION

Problem(s) to be Solved by the Invention

However, e-mail systems disclosed in the above-referenced Japanese Patent Application Laid-Open H7-162452 and Japanese Patent Application Laid-Open H7-183912 has a problem that is insufficiency of the management of the time limit on a received mail.

More specifically, according to the technology disclosed by Japanese Patent Application Laid-Open H7-162452, a mail sender can only set a time limit for opening of a mail. Consequently, there is a possible risk that a mail recipient fails to notice the existence of an attachment file and miss it even if very significant information is included in an attached file. In particular, attached files such as a picture or voice that are transmitted and received between cellular phones are stored on a server temporally. On this account, because there is a fear that these attached files are deleted if a recipient forgets to get them, an attention is necessary.

Although a mail sender can set a reply necessity with technology disclosed in Japanese Patent Application Laid-Open H7-183912, but cannot set a reply time limit. For these limitations, a recipient has a risk to leave a mail, which is necessary to reply, without reply, when time is required for consideration of the contents or for search of necessary information after opening the mail (i.e. when time passed beyond a time limit of opening).

It is an object of the present invention to provide a mail receiver and a network server without a fear to overlook an attachment file added to a received mail. It is also an object of the present invention to provide a mail receiver and a network server without a fear to leave the mail, which needs a reply, without a reply. It is still another object of this invention to provide a mail receiver and a network server, which can manage time limits regarding a received mail more certainly.

Means for Solving the Problems

The first mail receiver of the present invention is comprising with
  a mail receiving unit that receives a mail to which an attached file and a reference time limit of the attached file are appended;
  a monitoring unit that monitors whether the attached file was referred to by a user; and
  a warning unit that warns the user of one which the reference time limit is approaching among a non-referenced attached file.

The second mail receiver of the present invention is comprising with
  a mail receiving unit that receives a mail to which a reply time limit is appended;
  a monitoring unit that monitors whether a reply by a user was performed to the mail;
  a warning unit that warns the user of one which the reply time limit is approaching among a non-replied mail.

The first network server of the present invention is comprising with a storage unit that stores an attached file and a reference time limit appended to a mail which a mail receiver received;

a monitoring unit that monitors whether a stored attached file was referred to by the user who use the mail receiver; and a warning unit that directs the mail receiver to warn the user of one which the reference time limit is approaching among a non-referenced attached file.

The second network server of the present invention is comprising with a storage unit that stores a reply time limit appended to a mail which a mail receiver received;

a monitoring unit that monitor whether the reply by a user who use the mail receiver was performed to a mail corresponding to a stored reply time limit; and a warning unit that directs the mail receiver to warn the user of one which the reply time limit is approaching among a non-replied mail.

The first time limit management method of a received mail of the present invention comprises:

receiving a mail to which an attached file and a reference time limit are appended;

monitoring whether the attached file was referred to by the user; and warning the user of one which the reference time limit is approaching among a non-referenced attached file.

The second time limit management method of a received mail of the present invention comprises:

receiving a mail to which a reply time limit is appended;

monitoring whether a reply by a user was performed to the mail; and warning the user of one which the reply time limit is approaching among a non-replied mail.

The Effect of the Invention

According to the first mail receiver of the present invention, a mail receiving unit receives a mail to which an attached file and a reference time limit of the attached file are appended;

a monitoring unit monitors whether the attached file was referred to by a user; and a warning unit warns the user of one which the reference time limit is approaching among a non-referenced attached file.

Consequently, there is not a fear to overlook an attachment file added to a received mail, and it can manage time limits regarding a received mail more certainly.

According to the second mail receiver of the present invention, a mail receiving unit receives a mail to which a reply time limit is appended;

a monitoring unit monitors whether a reply by a user was performed to the mail;

a warning unit warns the user of one which the reply time limit is approaching among a non-replied mail.

Consequently, there is not a fear to leave a mail, which needs a reply, without a reply, and it can manage time limits regarding a received mail more certainly.

According to the first network server of the present invention, a storage unit stores an attached file and a reference time limit appended to a mail which a mail receiver received;

a monitoring unit monitors whether a stored attached file was referred to by the user who use the mail receiver; and a warning unit directs the mail receiver to warn the user of one which the reference time limit is approaching among a non-referenced attached file.

Consequently, there is not a fear to overlook an attachment file added to a received mail, and it can manage time limits regarding a received mail more certainly According to the second network server of the present invention, a storage unit stores a reply time limit appended to a mail which a mail to receiver received;

a monitoring unit monitor whether the reply by a user who use the mail receiver was performed to a mail corresponding to a stored reply time limit; and a warning unit directs the mail receiver to warn the user of one which the reply time limit is approaching among a non-replied mail.

Consequently, there is not a fear to leave a mail, which needs a reply, without a reply, and it can manage time limits regarding a received mail more certainly.

DESCRIPTION OF SYMBOLS 1, 1a, 1b E-MAIL SYSTEM
10, 10a, 10b MAIL TRANSMITTER
20, 20a, 20b MAIL RECEIVER
30, 30a, 30b MAIL
31, 31a, 31b MAIL HEADER
32 MESSAGE BODY
33 ATTACHED FILE
40 NETWORK SERVER
110 INPUT UNIT
120, 120a, 120b MAIL CREATION UNIT
121 MAIL HEADER CREATION UNIT
122 MESSAGE BODY CREATION UNIT
123 CREATION UNIT FOR REFERENCE TIME LIMIT OF ATTACHED FILE
124 CREATION UNIT FOR OBJECT-PERSON FOR THE REFERENCE TIME LIMIT OF ATTACHED FILE
125 MAIL ENCLOSING UNIT
126 CREATION UNIT OF MAIL REPLY TIME LIMIT
127 CREATION UNIT OF OBJECT-PERSON FOR THE MAIL REPLY TIME LIMIT
128 CREATION UNIT OF TIME LIMIT FOR OPENING MAIL
129 CREATION UNIT OF OBJECT-PERSON ON TIME LIMIT FOR OPENING MAIL
130 MAIL TRANSMISSION UNIT
210 MAIL RECEIVING UNIT
220 MAIL ACCUMULATION UNIT
230, 230a, 230b DETERMINATION UNIT OF OBJECT-PERSON FOR THE TIME LIMIT
240 TIME LIMIT ACCUMULATION UNIT
250, 250a, 250b MONITORING UNIT
260, 260a, 260b WARNING UNIT
261 DETERMINATION UNIT OF TIME LIMIT
262 ALARM EXECUTION UNIT
263 DISPLAY
264 SPEAKER
265 ALARM CANCELLATION UNIT
266 PREFERENTIAL DISPLAY UNIT
267 DEACTIVATION UNIT OF PREFERENTIAL DISPLAY
268 MAILER
269 MAILER ACTIVATION UNIT
270 MAILER DEACTIVATION UNIT
311 TRANSMISSION TIME AND DATE
312 TITLE
313 SENDER
314 ADDRESS
315 REFERENCE TIME LIMIT OF ATTACHED FILE
316 OBJECT-PERSON FOR THE REFERENCE TIME LIMIT OF ATTACHED FILE
317 MAIL REPLY TIME LIMIT
318 OBJECT-PERSON FOR THE MAIL REPLY TIME LIMIT
319 TIME LIMIT FOR OPENING MAIL
320 OBJECT-PERSON FOR THE TIME LIMIT FOR OPENING MAIL
410 STORAGE UNIT

BEST MODE FOR CARRYING OUT THE INVENTION

The first to the third embodiments of a mail receiver of the present invention will be described below with reference to the accompanying figures FIG. 1 to FIG. 20. Hereinafter, the identical element is given the identical symbol in each drawings, therefore a repetitive explanation is omitted according to the necessity for clarifying a explanation.

The First Embodiment

First, the first embodiment of a mail receiver of the present invention will be described.

Figure 1:
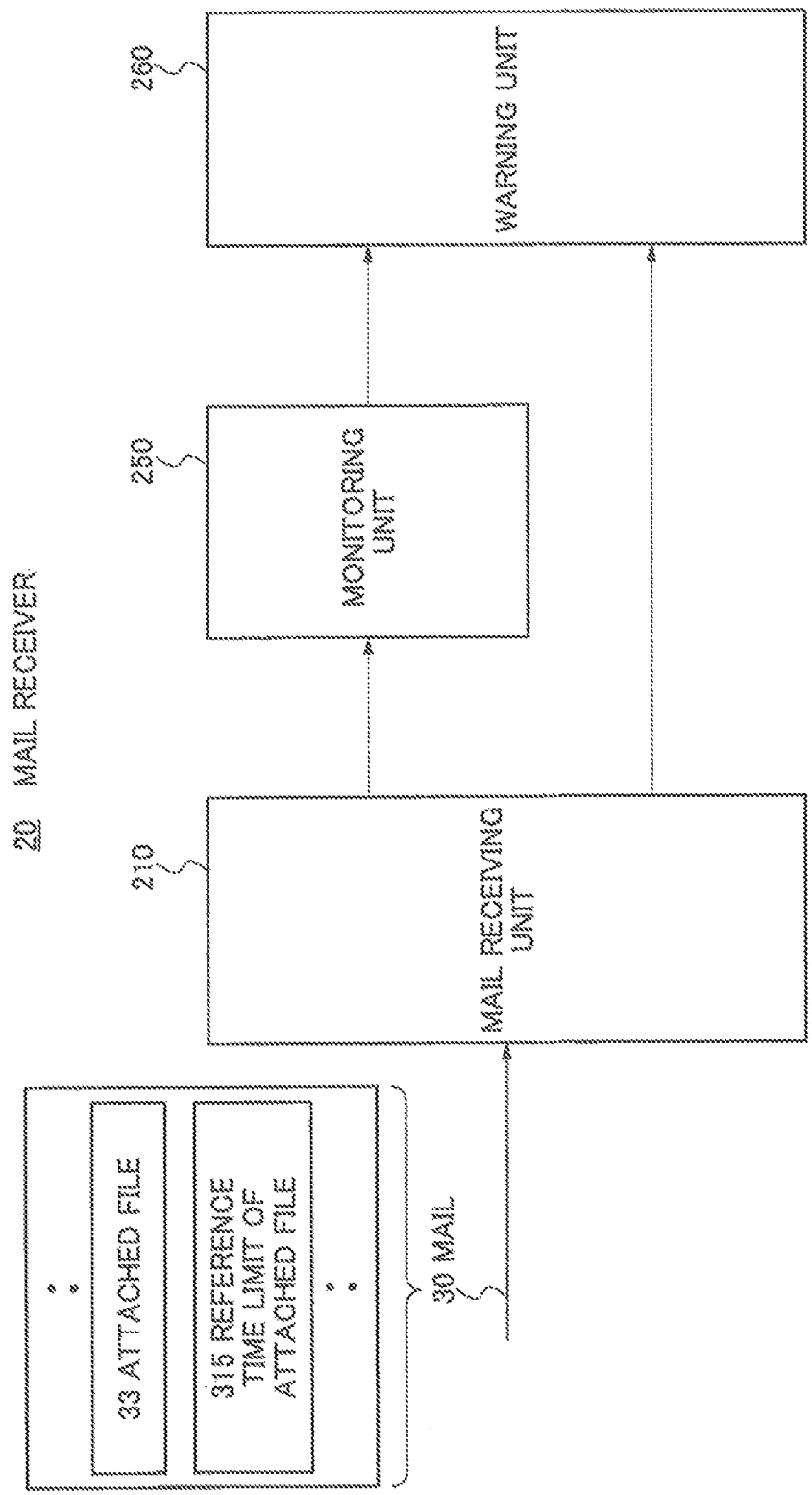
FIG. 1 shows the first embodiment of a mail receiver of the present invention.

FIG. 1 shows the first embodiment of a mail receiver of the present invention.

A mail receiver 20 of the first embodiment shown in FIG. 1 includes a mail receiving unit 210, a monitoring unit 250 and a warning unit 260.

The mail receiving unit 210 receives a mail 30 to which an attached file 33 and the reference time limit 315 of it are added.

The monitoring unit 250 monitors whether the attached file 33 was referred to by a recipient (a user).

The warning unit 260 warns the recipient of one which the reference time limit is approaching among a non-referenced attached file.

The above-mentioned control may be carried out based on a program by a computer such as CPU, which is not shown, included in the mail receiver 20.

As is described above, according to the mail receiver of the first embodiment, the monitoring unit monitors whether the attached file of a received mail was referred to by the user, and the warning unit warns the user of one which the reference time limit is approaching. Consequently, there is not a fear to overlook an attached file added a received mail. It also can be prevented that validity of an attached file is lost. Further, it can manage the time limits regarding the received mails more certainly.

An example of detail configuration and operation of the mail receiver 20 in the first embodiment shown in FIG. 1 will now be described with reference to an e-mail system 1 shown in FIG. 2 that applied the mail receiver 20.

Figure 2:
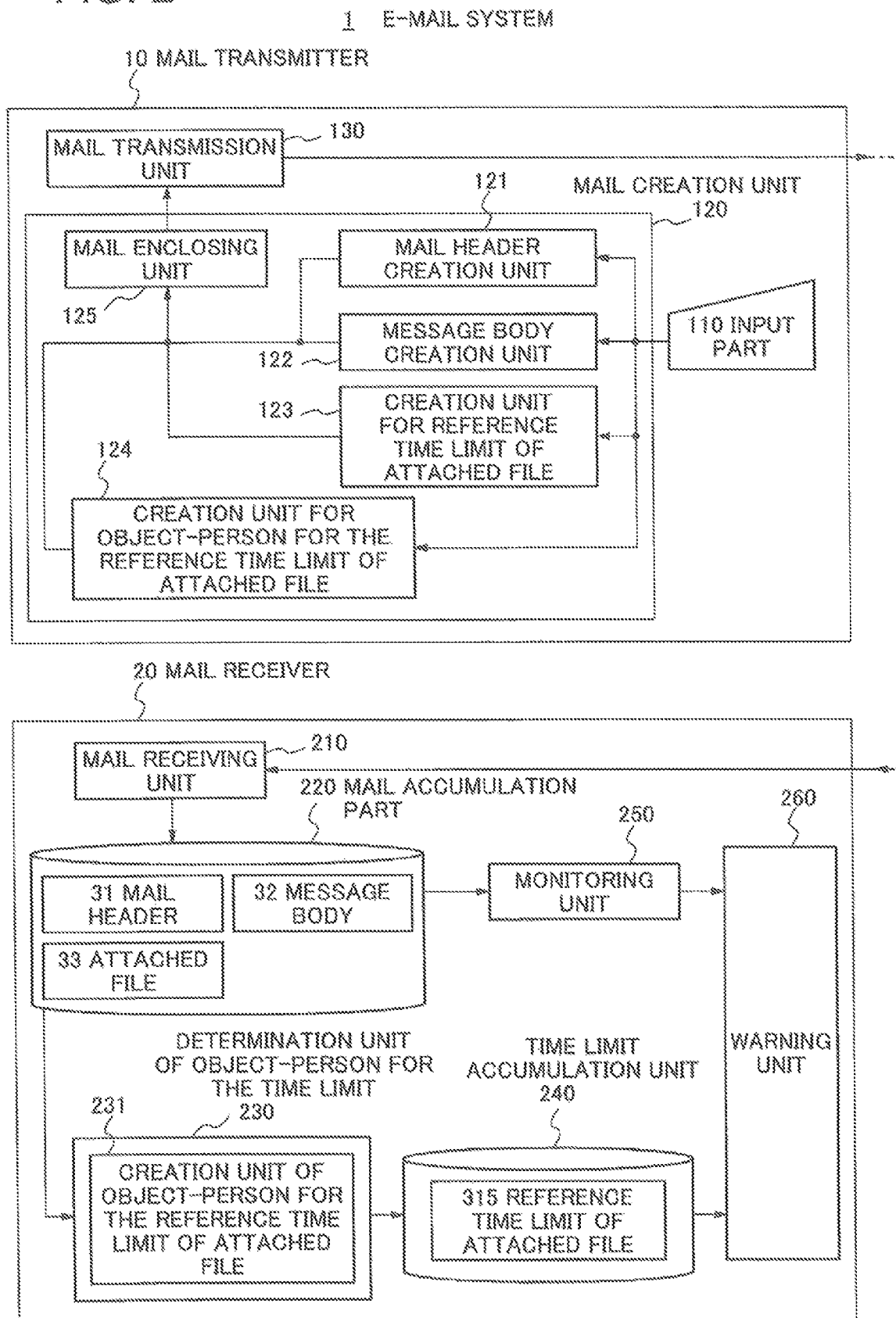
FIG. 2 is a block diagram showing a configuration example of an e-mail system that applied a mail receiver shown in FIG. 1.

FIG. 2 is a block diagram of a configuration example of the e-mail system that applied the mail receiver of the first embodiment.

The e-mail system 1 shown in FIG. 2 includes a mail transmitter 10 and the mail receiver 20. The mail transmitter 10 performs processing in reference to transmission of the mail and the mail receiver 20 performs processing in reference to reception of the mail. The mail transmitter 10 and the mail receiver 20 transmit and receive the mail via a network such as the internet and an intranet although the network is not illustrated.

Figure 3:
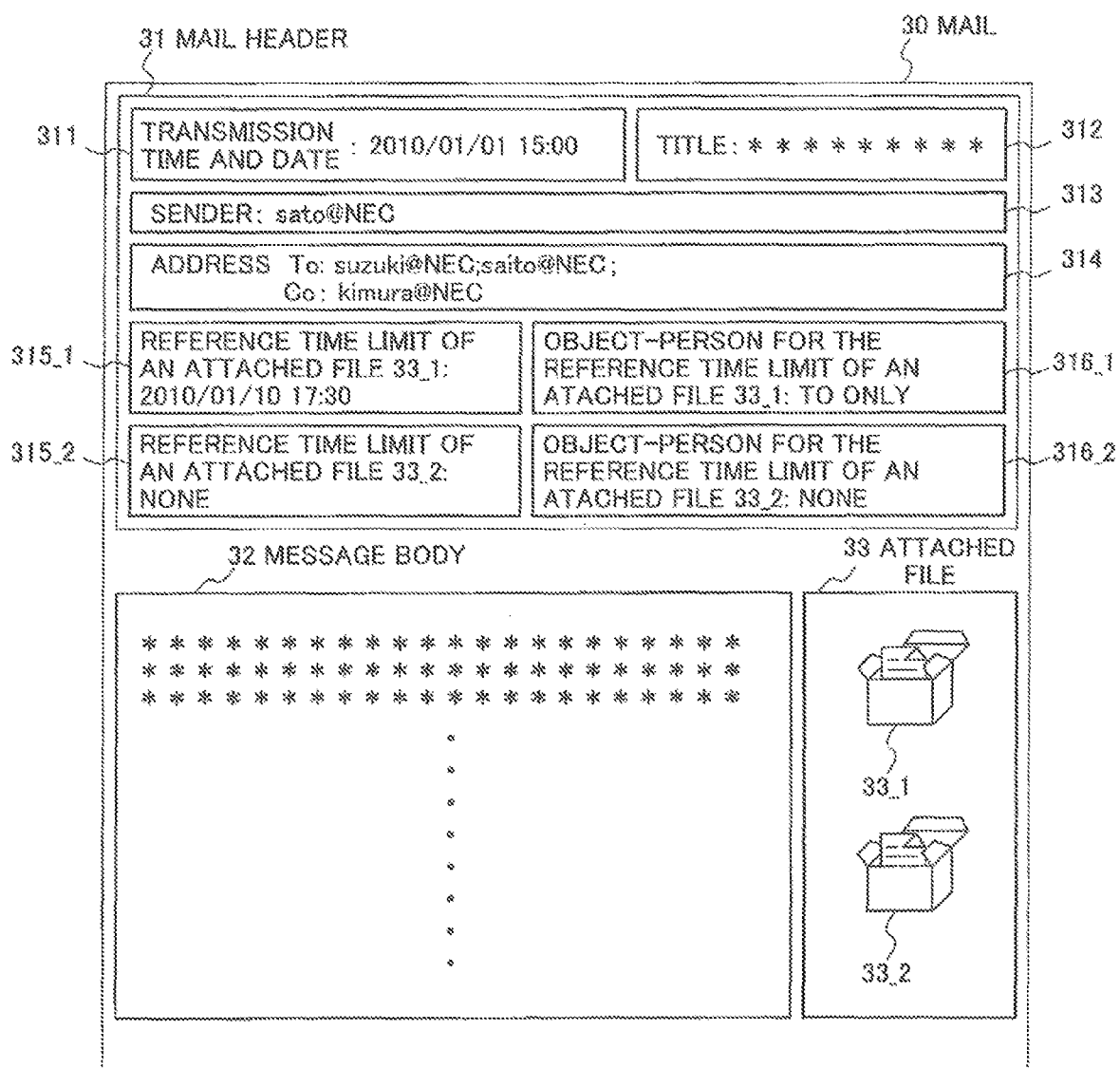
FIG. 3 shows a configuration example of a mail transmitted and received in an e-mail system.

FIG. 3 shows a configuration example of the mail transmitted and received in the e-mail system 1. The mail 30 is composed of a mail header 31, a message body 32 consisting of texts, and the attached file 33 (an attached file 33_1 and an attached file 33_2) as illustrated. In the mail header 31, a transmission time and date 311, a title 312, a sender 313, an address 314, a reference time limit 315_1 and 315_2 of the attached file 33_1 and the attached file 33_2, and an object-person 316_1 and 316_2 on the reference time limit 315_1 and 315_2 of the mail 30 are provided.

The reference time limit of attached file 315_1 and 315_2 are called "a reference time limit of attached file" and are sometimes called with the symbol "315" collectively. The object-person for the reference time limit of attached file 316_1 and 316_2 are called an "object-person for the reference time limit of attached file" and are sometimes called with a symbol "316" collectively.

Returning to FIG. 2, the mail transmitter 10 includes an input unit 110, a mail creation unit 120 and a mail transmission unit 130. The input unit 110 inputs mail information from the sender. The mail creation unit 120 creates the mail 30 shown in FIG. 3 according to the mail information received from the input unit 110. The mail transmission unit 130 transmits the mail 30 created by the mail creation unit 120 via a network. The mail creation unit 120 includes a mail header creation unit 121, a message body creation unit 122, a creation unit for a reference time limit of attached file 123, a creation unit for object-person for the reference time limit of attached file 124 and an enclosing unit 125. The mail header creation unit 121 creates information except the reference time limit of attached file 315 and the object-person 316 in the mail header 31, and inserts the attached file 33 to the mail header 31. The message body creation unit 122 creates the message body 32. The creation unit for reference time limit of attached file 123 creates the reference time limit of attached file 315. The creation unit for object-person for the reference time limit of attached file 124 creates the object-person for the reference time limit of attached file 316. The mail enclosing unit 125 encloses the mail header 31 to be inserted the attached file 33 in and the message body 32 into a mail 30.

In corresponding to this, the mail receiver 20 includes the mail receiving unit 210, a mail accumulation unit 220, a determination unit of object-person for the time limit 230, a time limit accumulation unit 240, the monitoring unit 250, and the warning unit 260. The mail receiving unit 210 receives the mail 30 via a network. The mail accumulation unit 220 accumulates the mail 30 (the mail header 31, the message body 32 and the attached file 33) received at the mail receiving unit 210. The determination unit of object-person for the time limit 230, which has a determination unit of object-person for the reference time limit of attached file 231, determines whether the recipient is the object-person of the reference time limit of attached file 315 by using the determination unit of object-person for the reference time limit of attached file 231 based on the object-person for the reference time limit of attached file 316 in the mail header 31. The time limit accumulation unit 240 accumulates the reference time limit of attached file 315 which the determination unit of object-person for the time limit 230 determined that the recipient is the object-person. The monitoring unit 250 monitors whether the attached file 33 was referred to by the recipient. The warning unit 260 warns the recipient based on a monitoring result of the monitoring unit 250 and the reference time limit of attached file 315.

Figure 4A:
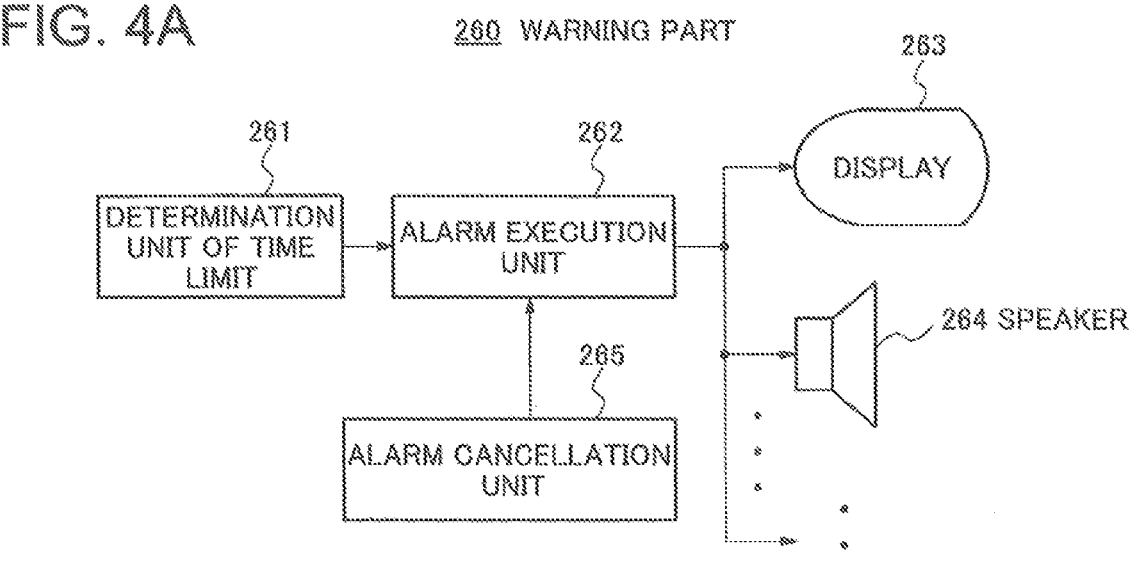
FIG. 4A is a block diagram showing the first configuration example of a warning unit of a mail receiver of the present invention.
Figure 4B:
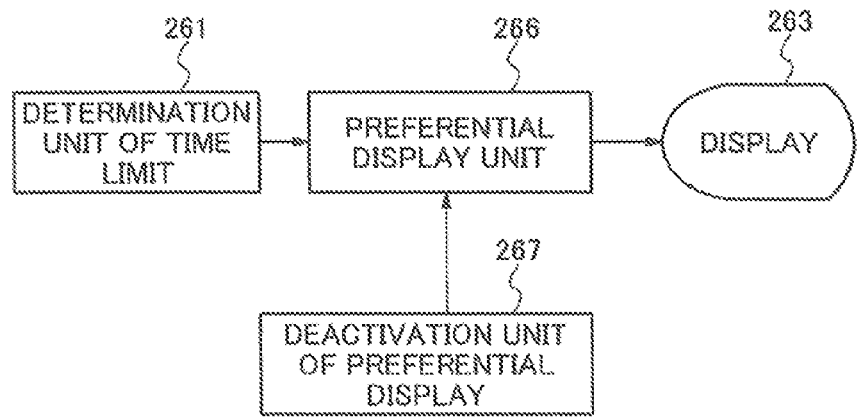
FIG. 4B is a block diagram showing the second configuration example of a warning unit of a mail receiver of the present invention.
Figure 4C:
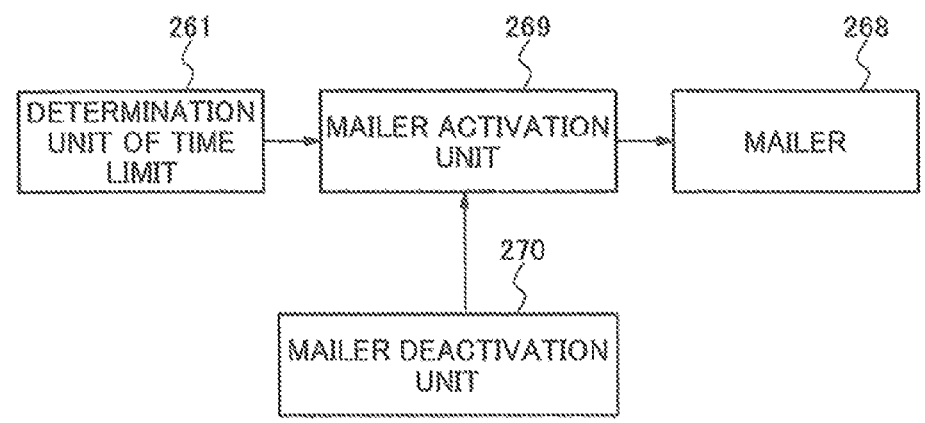
FIG. 4C is a block diagram showing the third configuration example of a warning unit of a mail receiver of the present invention.

FIGS. 4A to 4C are block diagrams illustrating the first to third configuration examples of the warning unit in the mail receiver of the present invention, respectively.

As shown in FIG. 4A, the warning unit 260 includes a determination unit of time limit 261, an alarm executing unit 262, a display 263, a speaker 264 and an alarm cancellation unit 265. The determination unit of time limit 261 determines a reference time limit of an attached file, which was judged as not to be referenced in the monitoring unit 250. The alarm executing unit 262 performs an alarming (notification) according to the determination result of the determination unit of time limit 261. The alarm executing unit 262 uses the display 263 and the speaker 264 as an alarm execution means. The alarm cancellation unit 265 cancels the execution of an alarm according to the recipient's request.

Here, the display 263 and the speaker 264 which are the alarm execution means notifies the recipient of the alarm by an image, light and sound respectively, to appeal to eyesight and hearing. However, the alarm execution means is not limited for appealing sight and hearing, any other means for appealing to one's five senses (eyesight, hearing, touch, taste, smell) such as vibration and smell for notifying an alarm can be used.

The warning unit 260, as shown in the FIG. 4B, can also be configured with the determination unit of time limit 261, a preferential display unit 266 which displays a mail, whose reference time limit of attached file is approaching, on the display 263 preferentially, a deactivation unit of preferential display 267 which deactivates the preferential display by the preferential display unit 266.

In other way, the warning unit 260, as shown in the FIG. 4C, can be configured, with the determination unit of time limit 261, a mailer activation unit 269, which activates mailer 268 automatically for executing alarm, and a mailer deactivation unit 270 which deactivates the automatic activation of the mailer 268 caused by the mailer activation unit 269. The warning unit 260 can be configured by the combination of each block in FIGS. 4A to 4C as well.

[Example of Operation]

Next, an example of operation of the first embodiment of the mail receiver 20 of the present invention will be described. First, an example of mail transmission operation in the mail transmitter 10 shown in FIG. 2 will be described with reference to FIG. 5. Next, an example of alarm execution operation and a mail receiving operation in the mail receiver 20 will be described with reference to FIGS. 6 and 7 respectively.

Figure 5:
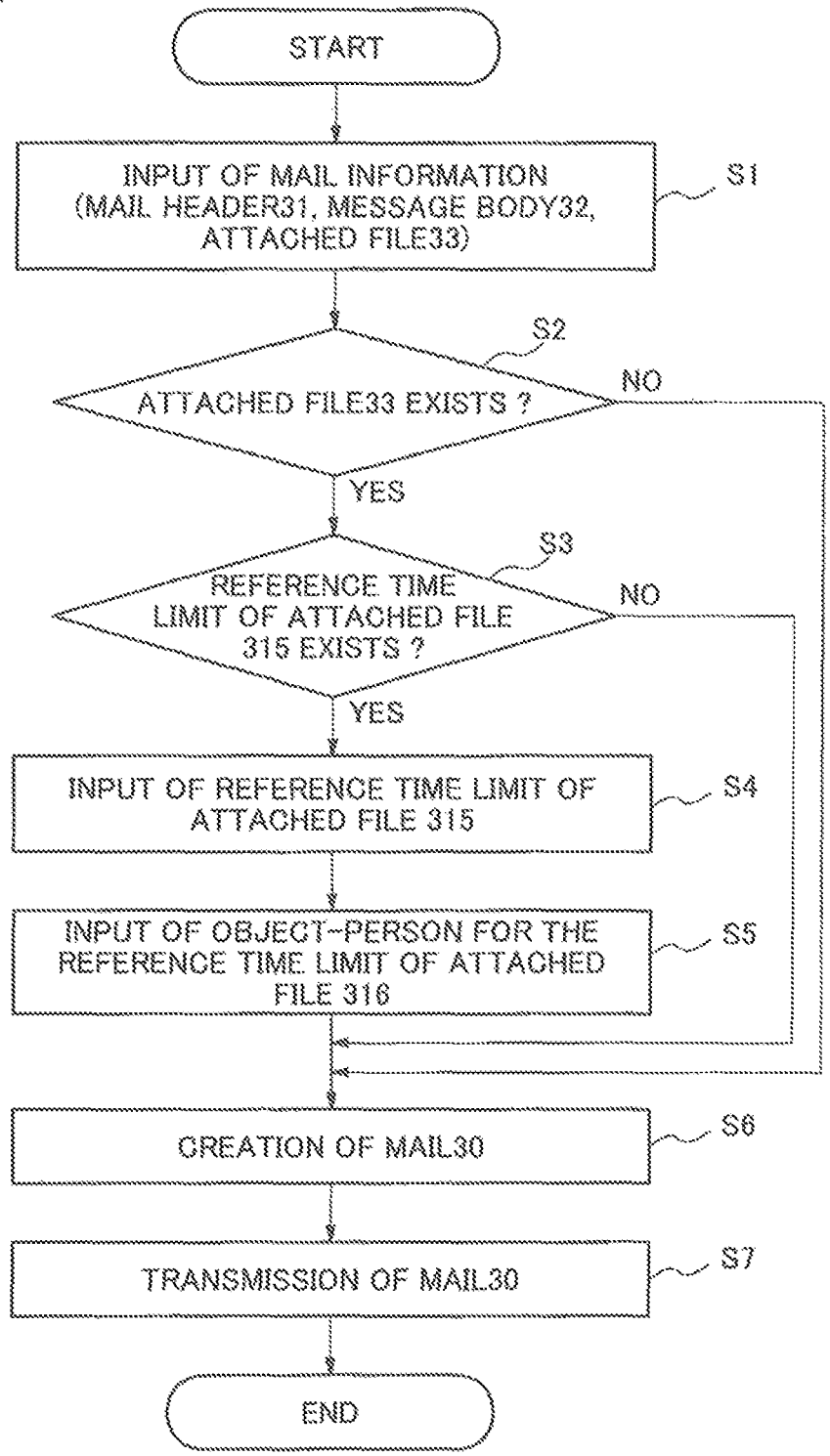
FIG. 5 is a flowchart showing an example of a mail transmission operation of a mail transmitter utilized in an e-mail system that applied the first embodiment of a mail receiver of the present invention.

FIG. 5 is a flowchart showing an example of a mail transmission operation of the mail transmitter utilized in the e-mail system that applied the first embodiment of a mail receiver of the present invention.

Figure 6:
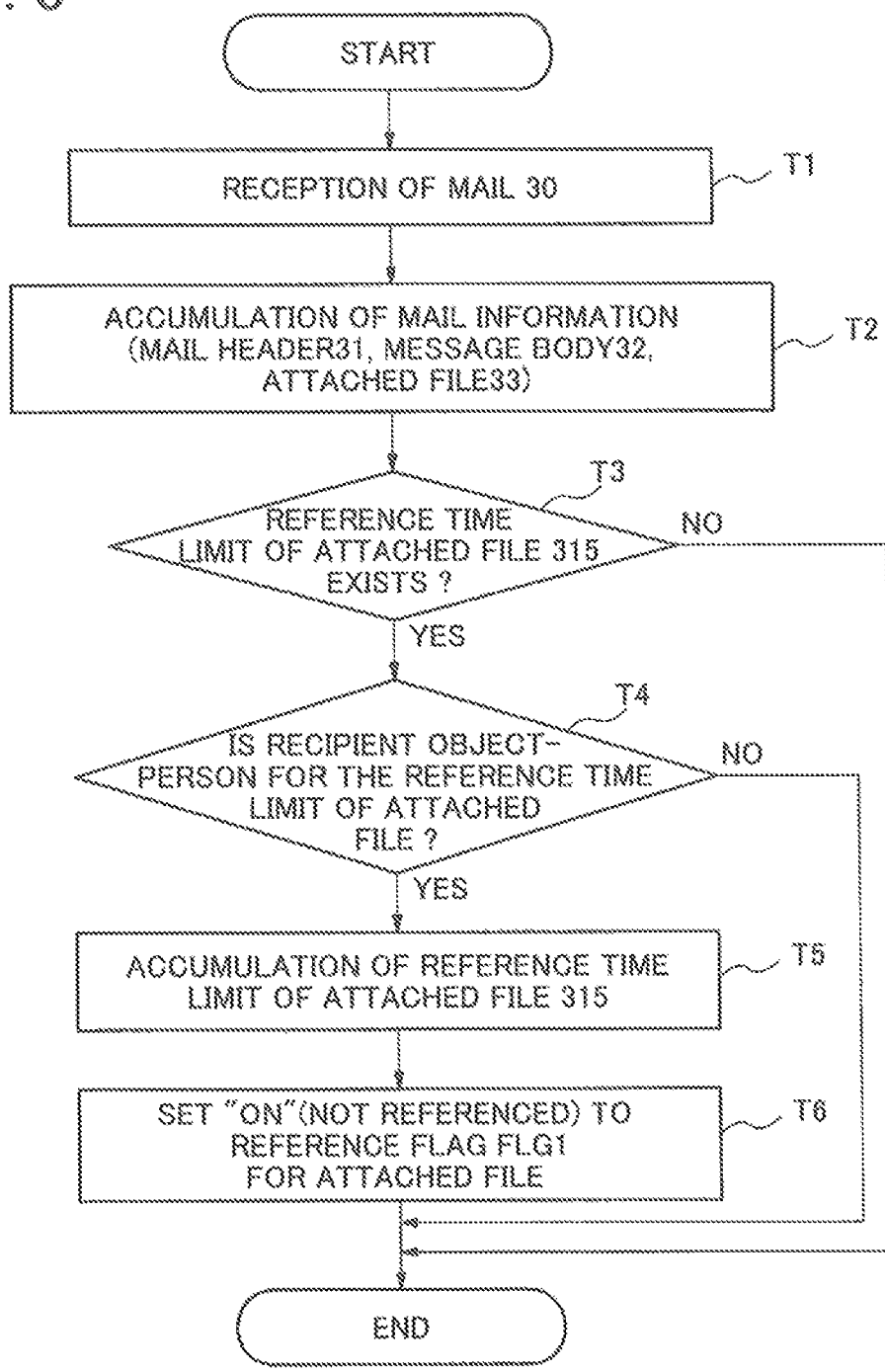
FIG. 6 is a flowchart showing an example of a mail receiving operation in the first embodiment of a mail receiver of the present invention.

FIG. 6 is a flowchart showing an example of a mail receiving operation in the first embodiment of the mail receiver of the present invention.

Figure 7:
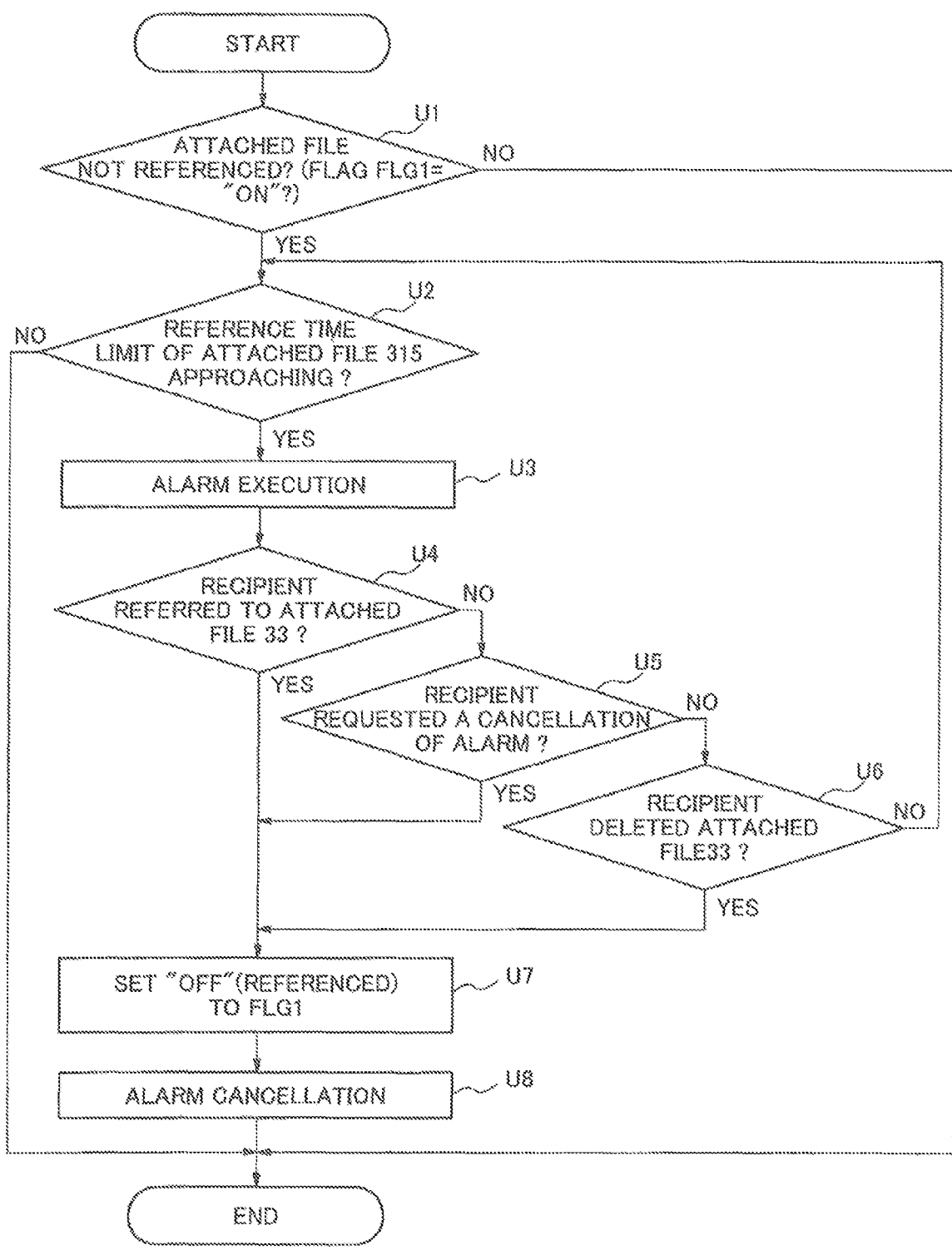
FIG. 7 is a flowchart showing an example of an alarm execution operation in the first embodiment of a mail receiver of the present invention.

FIG. 7 is a flowchart showing an example of an alarm execution operation in the first embodiment of the mail receiver of the present invention.

First, an example of a mail transmission operation in the mail transmitter 10 shown in FIG. 2 will be described.

In the step S1 of FIG. 5, mail information from a sender is entered by the input unit 110. Then, the mail header creation unit 121 in the mail creation unit 120 creates mail header 31, in which the mail header information (the transmission time and date 311, the title 312, the sender 313 and the address 314) shown in FIG. 3 of the mail information are set, and the attached file information is inserted into the mail header 31 (not shown) when the input mail information has any attached file information. In parallel with this, the message body creation unit 122 in the mail creation unit 120 creates the message body 32 based on the message body information in the mail information entered by the input unit 110.

In the step S2 of FIG. 5, the mail header creation unit 121 of the mail transmitter examines whether attached file information is inserted in the mail header 31, and continues to the step S3 when it is determined that attached file information is inserted. When it is determined that attached file information is not inserted, the flow goes to the step S6.

In the step S3 of FIG. 5, the mail transmitter examines whether the sender requests for setting the reference time limit of attached file 315. This can be performed, for example, by displaying a question whether or not to request a setting of the reference time limit of attached file 315 (FIG. 3) on the display (not shown), and by getting an answer from the input unit 110. The flow goes to the step S4 when the result of the examination shows the request for setting of the reference time limit of attached file 315. The flow goes to the step S6 when the result of the examination does not show the request for setting of the reference time limit of attached file 315.

In the step S4 of FIG. 5, the creation unit for reference time limit of attached file 123 receives "year/month/date/time(second)" indicating the to reference time limit of the attached file, which is entered to the input unit 110 by the sender, and sets it as the reference time limit of attached file 315.

In the step S5 of FIG. 5, the creation unit for object-person for the reference time limit of attached file 124 takes a transmission classification (All/To/CC/BCC) or an address entered from the input unit 110 as the object-person for the reference time limit of attached file 316, when transmitting an attached file to a plurality of receiver. In other words, all addresses included in the "To" part are considered to be the object-person for the reference time limit of attached file 316 when the "To" in transmission classification is assigned as the object-person for the reference time limit of attached file 316. Then the flow goes to step S6.

In the example of FIG. 3, the reference time limit 315_1 of an attached file 33_1 is set "2010/01/01 17:30" and the object-person for the reference time limit 316_1 of attached file 33_1 is set "transmission classification To only" respectively. This means that the addresses (suzuki@NEC and saito@NEC) corresponding to "To" of the object-person for the reference time limit 316_1 of attached file 33_1 show the address of the object-person for the reference time limit. "None" is set for both the reference time limit an of attached file 33_2 315_2 and object-person for the reference time limit of attached file 33_2 316_2.

In the step S6 of FIG. 5, the mail enclosing unit 125 encloses each information created in each above-mentioned step and creates the mail 30. The mail enclosing unit 125 creates the mail 30 by enclosing the attached file corresponding to the attached file information inserted into the mail header 31, when a attached file information is inserted into the mail header 31 in the step S1 of FIG. 5.

In the step S7 of FIG. 5, the mail transmission unit 130 transmits the mail 30 created by the mail enclosing unit 125 via network.

Next, an example of mail receiving operation in the mail receiver 20 will be described with reference to FIG. 2 and FIG. 6.

In the step T1 of FIG. 6, the mail receiving unit 210 in the mail receiver 20 receives the mail 30 transmitted from the mail transmitter 10.

In the step T2 of FIG. 6, the mail header 31, the message body 32 and the attached file 33 in the mail 30 received in the mail receiving unit 210 are related each other and stored in the mail accumulation unit 220.

In the step T3 of FIG. 6, the determination unit of object-person for the reference time limit of attached file 231 examines whether the reference time limit of attached file 315 is set in the mail header 31 of the received mail 30. The flow goes to the step T4 when the result of the examination shows that the reference time limit of attached file 315 is set. The process is terminated when the result of the examination does not show that the reference time limit of attached file 315 is set.

In the step T4 of FIG. 6, the determination unit of object-person for the reference time limit of attached file 231 examines whether the recipient is the object-person of the reference time limit of attached file 315 with reference to the object-person for the reference time limit of attached file 316 in the mail header 31. In other words, it is examined whether recipient's address is in the address corresponding to transmission classification indicated by the object-person for the reference time limit of attached file. The flow goes to the step T5, when an examined result shows that a recipient is the object-person of the reference time limit of attached file 315. The process is terminated when the result of the examination does not show that a recipient is the object-person of the reference time limit of attached file 315.

In the step T5 of FIG. 6, the determination unit of object-person for the reference time limit of attached file 231 stores the reference time limit of attached file 315 in the mail header 31 in the time limit accumulation unit 240.

Then, in the step T6 of FIG. 6, the monitoring unit 250 sets "ON (not-referenced)" to the attached file reference flag FLG1 stored inside itself, and the process is terminated.

The monitoring unit 250 is designed to set "OFF (referred)" to the attached file reference flag FLG1 when the attached file 33, corresponding to the attached file reference flag FLG1 which is set "ON (not-referred)", is referred to or deleted by the recipient.

Next, an example of alarm execution operation in the mail receiver 20 with reference to FIG. 2 and FIG. 7 will be described.

In the step U1 of FIG. 7, the warning unit 260 refers to the attached file reference flag FLG1 stored in the monitoring unit 250, and determines whether the flag FLG1 is OFF or not, in other words whether or not the attached file 33 was referred to by a recipient. If the result of the determination shows that the attached file reference flag FLG1 is OFF, in other words if the attached file 33 was referred to, the warning unit 260 does not execute any process and the process is terminated. If the result of the determination shows that the attached file reference flag FLG1 is ON, the flow continues to the step U2.

In the step U2 in FIG. 7, the warning unit 260 refers to the reference time limit of attached file 315 stored in the time limit accumulation unit 240 and determines whether or not the reference time limit of attached file 33 is approaching.

If the result of the determination shows that the reference time limit of attached file 33 is approaching, the flow continues to the step U3. If the result of the determination does not show that the reference time limit of attached file 33 is approaching, in other words there is time to spare for the reference time limit, the warning unit 260 terminates the process.

In the step U3 of FIG. 7, the warning unit 260 executes an alarm operation with any of the means shown in FIG. 4A to 4C and informs the recipient that the reference time limit of attached file 33 is approaching. After that, the process continues to the step U4.

In the step U4 of FIG. 7, the monitoring unit 250 examines whether the attached file 33 was referred to by the recipient. If the result of the examination shows that the recipient referred, the flow continues to the step U7. If the result of the examination does not show that the recipient referred, the flow continues to the step U5. It is examined whether the attached file 33 was referred to by the recipient as follows. The referencing of the attached file by the recipient is carried out by a mail receiver displaying the attached file in the mail accumulation unit to a display means (not shown) according to the instruction from a input means (not shown) operated by the recipient. The monitoring unit 250 monitors the access of the mail receiver to the attached file in the mail accumulation unit for the purpose of the display on the display means, and examines whether or not the reference of the attached file exists.

In the step U5 of FIG. 7, the monitoring unit 250 monitors the alarm cancellation request from the input means by operating the input means by the recipient and examines whether or not the alarm cancellation request exists. If the result shows that the alarm cancellation request is accepted, the step continues to the step U7. If the result does not show that the alarm cancellation request is accepted, the step continues to the step U6.

In the step U6 of FIG. 7, the monitoring unit 250 monitors the attached file deletion request from the input means by operating the input means by the recipient and examines whether or not the attached file deletion request exists.

If the result of the examination shows that the attached file deletion request is accepted, the monitoring unit 250 deletes the attached file from the mail accumulation unit and the reference time limit of attached file corresponding to the attached file in the time limit accumulation unit.

Then the flow continues to the step U7. If the result of the examination does not show that the attached file deletion request is accepted, the flow goes back to the step U2.

In the step U7 of FIG. 7, the monitoring unit 250 sets "OFF (referenced)" to the attached file reference flag FLG1.

In the step U8 of FIG. 7, the warning unit 260 cancels the alarm executed in the step U3 and the process is terminated.

As described above, the warning unit 260 executes the above mentioned steps U2 and U3 repeatedly and keeps informing the recipient periodically that the reference time limit of attached file is approaching when the recipient does not take any actions of referring to the attached file 33, deleting the attached file 33, and requesting for canceling the alarm.

As described above, in the first embodiment of the mail receiver of the present invention, it is possible to prevent losing the validity of the attached file since the mail which the reference time limit is approaching can be warned to the recipient certainly.

And the warning can be notified when the reference time limit of attached file is approaching and only when assigned as the object-person for the reference time limit of attached file in the received mail. On this account, the warning about the reference time limit of attached file will not be notified when not designated as the object-person for the reference time limit of attached file. On this account, the recipient without designation as the object-person for the reference time limit of attached file can reduce the burden such as receiving the warning about the reference time limit of the attached file and coping with this.

Figure 8:
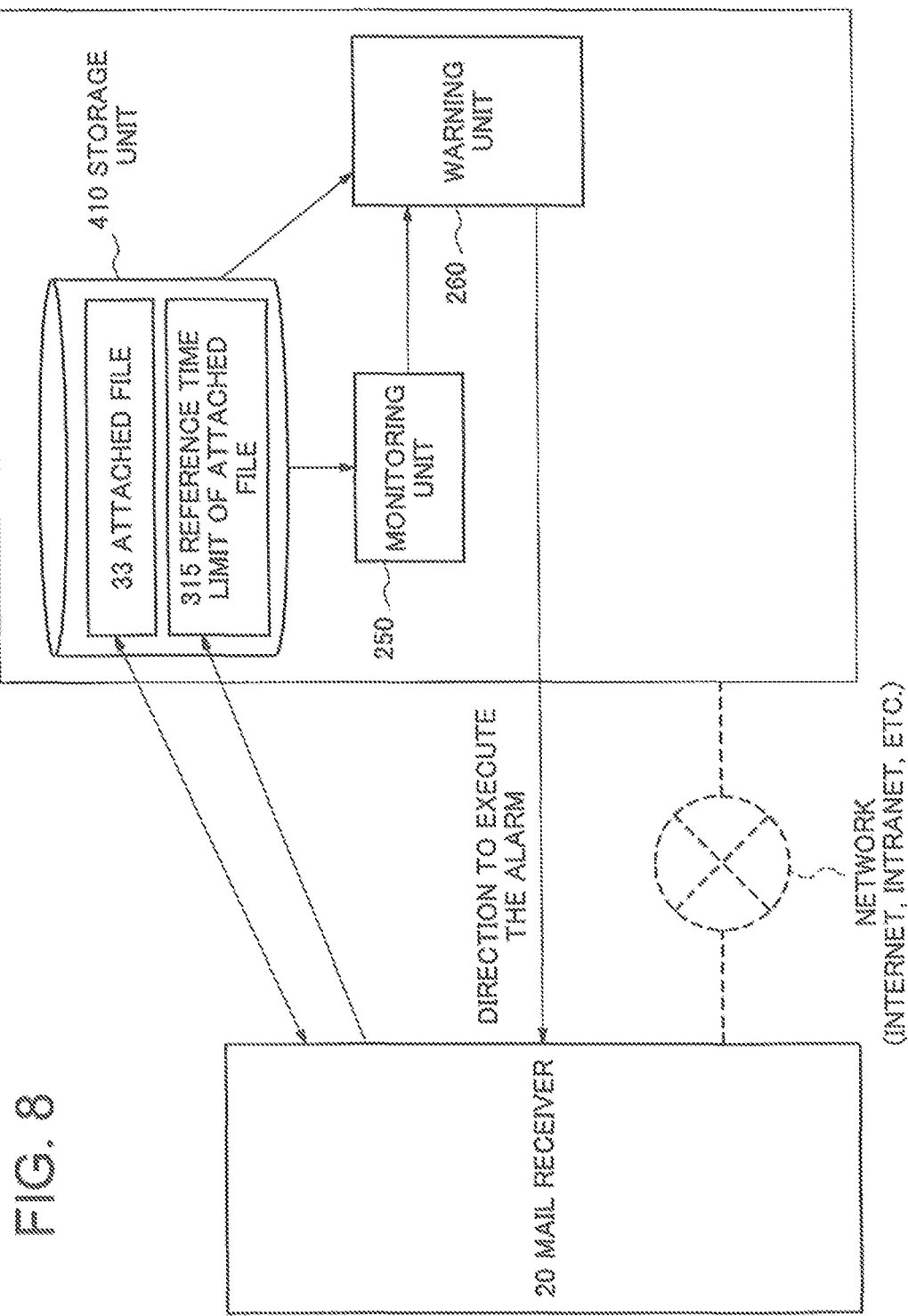
FIG. 8 is a block diagram showing an example of relations with a mail receiver and a network server when a monitoring unit and a warning unit are set in the network server.

Additionally, the monitoring unit 250 and the warning unit 260 in the mail receiver 20 shown in FIG. 2 can be provided on the network server 40 connected to the mail receiver 20 via network such as the internet and an intranet as shown in FIG. 8.

FIG. 8 is a block diagram showing an example of relations with a mail receiver and a network server when a monitoring unit and a warning unit are set in the network server.

In this case, the mail receiver 20 uploads the attached file 33 and its reference time limit 315 both appended to the received mail 30 to storage unit 410 in the network server 40 and obtains (refers to) the attached file 33 by accessing the network server 40 If necessary.

The monitoring unit 250 monitors the access of the mail receiver 20 to the attached file 33 and renews the attached file reference flag FLG1 like the case that the monitoring unit 250 is provided in the mail receiver 20. The warning unit 260 determines the necessity of the alarm execution based on the flag FLG1 and the reference time limit of attached file 315 stored in the storage unit 410, like the operation shown in FIG. 7. The warning unit 260 directs the direction to execute the alarm to the mail receiver 20 unlike the operation shown in FIG. 7 and makes the mail receiver 20 execute a desired alarm when the execution of alarm is necessary.

The Second Embodiment

Next, the second embodiment of the mail receiver of the present invention will be described.

Figure 9:
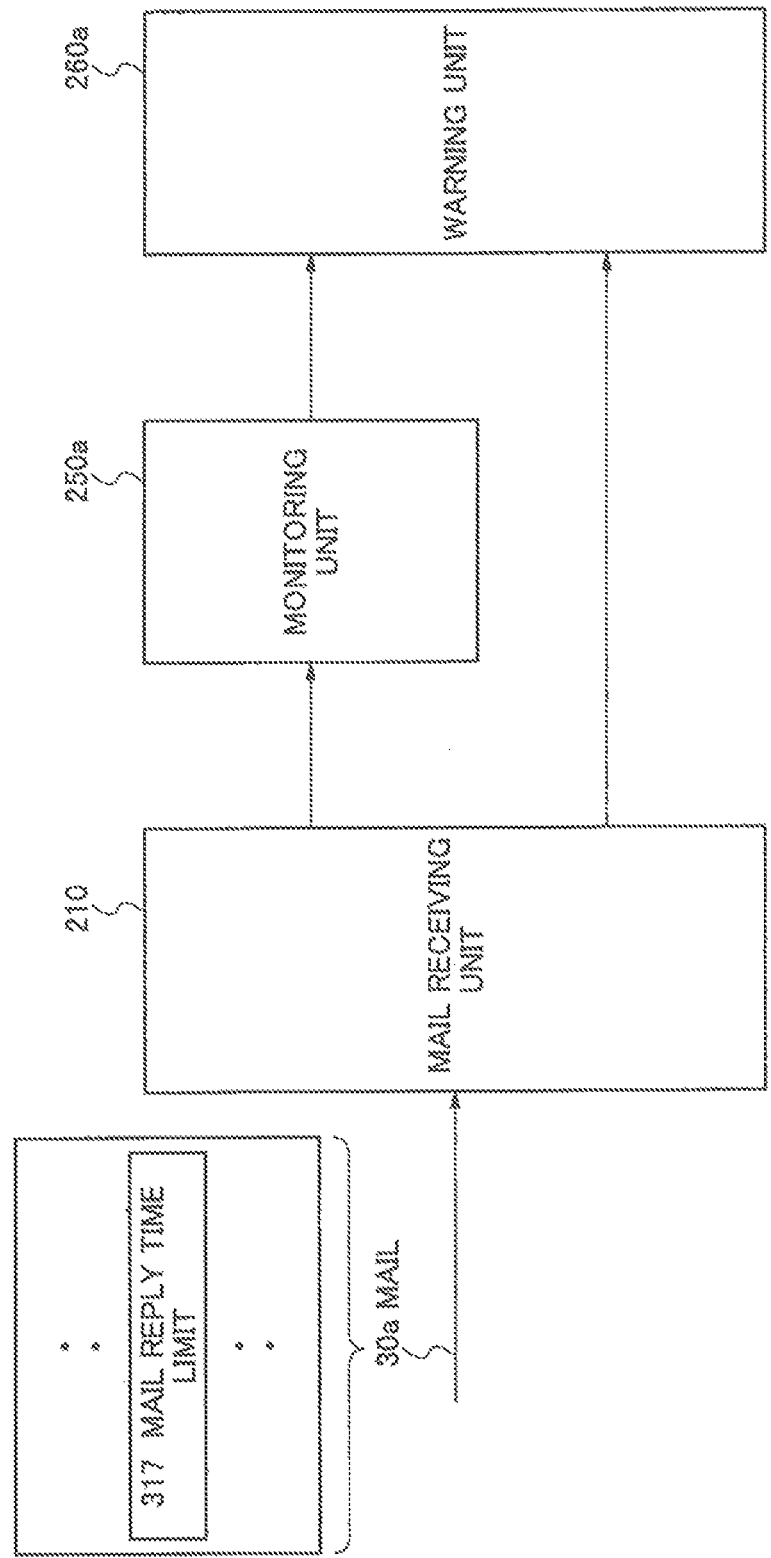
FIG. 9 shows the second embodiment of a mail receiver of the present invention.

FIG. 9 shows the second embodiment of the mail receiver of the present invention.

A mail receiver 20a of the second embodiment shown in FIG. 9 includes the mail receiving unit 210, a monitoring unit 250a and a warning unit 260a.

The mail receiving unit 210 receives a mail 30a to which a mail reply time limit 317 is added. The monitoring unit 250a monitors whether a reply of a mail 30a is performed by the recipient. The warning unit 260a warns the recipient of one which the reply time limit is approaching among the non-replied mail.

The above-mentioned control may be carried out by a computer such as CPU, which is not shown, included in the mail receiver 20a based on a program.

As described above, according to the mail receiver of the second embodiment, the monitoring unit monitors whether the reply of the received mail is performed by the user, and the warning unit warns the user of one which a reply time limit is approaching.

Consequently, there is not a fear to leave a mail, which needs a reply, without a reply. It also can be prevented that validity of an attached file is lost. Further, it can manage time limits regarding a received mail more certainly.

An example of detail configuration and operation of the mail receiver 20a shown in FIG. 9 will now be described with reference to an e-mail system 1a shown in FIG. 10 that applied the mail receiver 20a.

Figure 10:
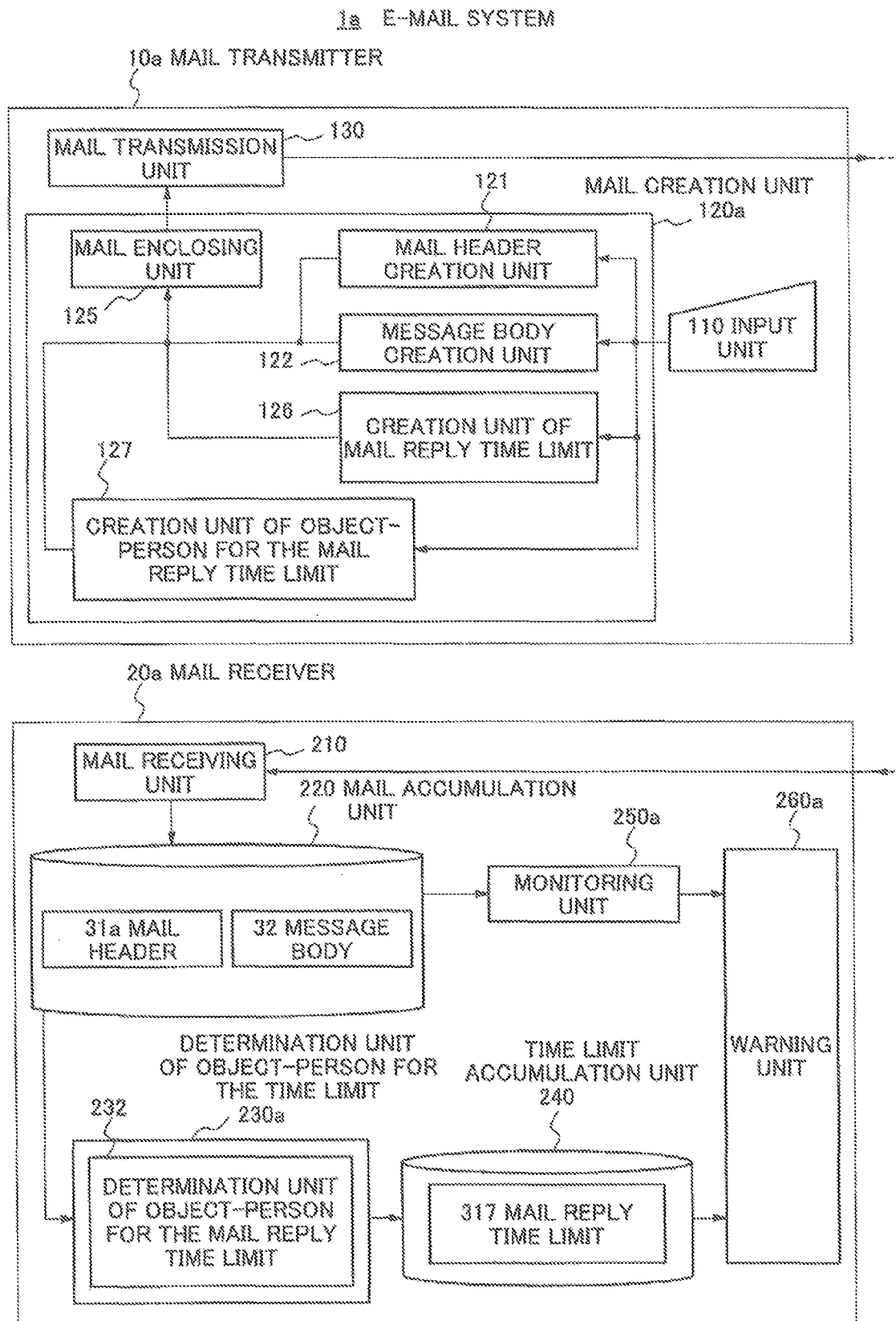
FIG. 10 is a block diagram showing a configuration example of an e-mail system that applied a mail receiver shown in FIG. 9.

The e-mail system 1a shown in FIG. 10 includes a mail transmitter 10a and the mail receiver 20a.

The mail transmitter 10a is a modified mail transmitter shown in FIG. 2 replacing the creation unit for reference time limit of attached file 123 and the creation unit for object-person for the reference time limit of attached file 124 with a creation unit of mail reply time limit 126 and a creation unit of object-person for the mail reply time limit 127. The mail receiver 20a is a modified mail transmitter shown in FIG. 2 replacing the determination unit of object-person for the reference time limit of attached file 231 with a determination unit of object-person for the mail reply time limit 232.

Figure 11:
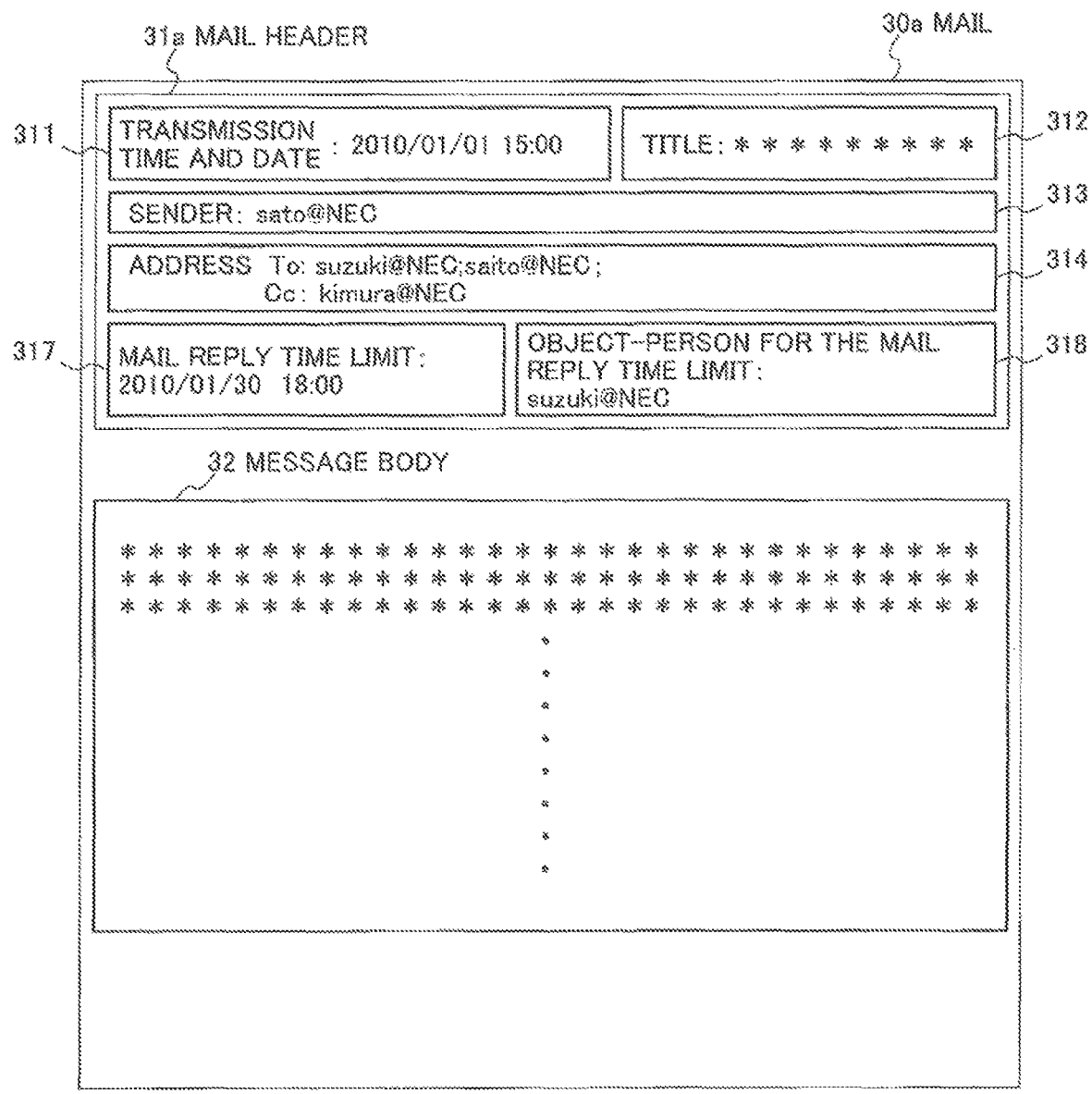
FIG. 11 shows a configuration example of a mail transmitted and received in an e-mail system.

FIG. 11 shows a configuration example of a mail transmitted and received in the e-mail system 1a. The mail 30a is composed of a mail header 31a and the message body 32 consisting of texts as illustrated.

In the mail header 31a, the transmission time and date 311, the title 312, the sender 313, the address 314, the mail reply time limit 317 and an object-person for the mail reply time limit information (called, an object-person for the mail reply time limit, hereinafter) 318 of the mail 30a are provided.

The creation unit of mail reply time limit 126 and the creation unit of object-person for the mail reply time limit 127 of the mail transmitter 10a shown in FIG. 10 are for producing the mail reply time limit 317 and the to object-person for the mail reply time limit 318 respectively.

The determination unit of object-person for the mail reply time limit 232 in the mail receiver 20a shown in FIG. 10 is for accumulating the mail reply time limit 317 in the time limit accumulation unit 240 when the receiver is determined as the object-person of the mail reply time limit 317 based on the object-person for the mail reply time limit 318.

The monitoring unit 250a of the mail receiver 20a shown in FIG. 10, unlike the monitoring unit 250 in FIG. 2, monitors whether the receiver replied to the mail.

The warning unit 260a warns the recipient based on the monitoring result of the monitoring unit 250a and the mail reply time limit 317.

[Example of Operation]

Next, an example of operation of the second embodiment of the mail receiver of the present invention will be described. First, an example of mail transmission operation in the mail transmitter 10a shown in FIG. 10 will be described with reference to FIG. 12. Next, an example of alarm execution operation and a mail receiving operation in the mail receiver 20a will be described with reference to FIGS. 13 and 14 respectively.

Figure 12:
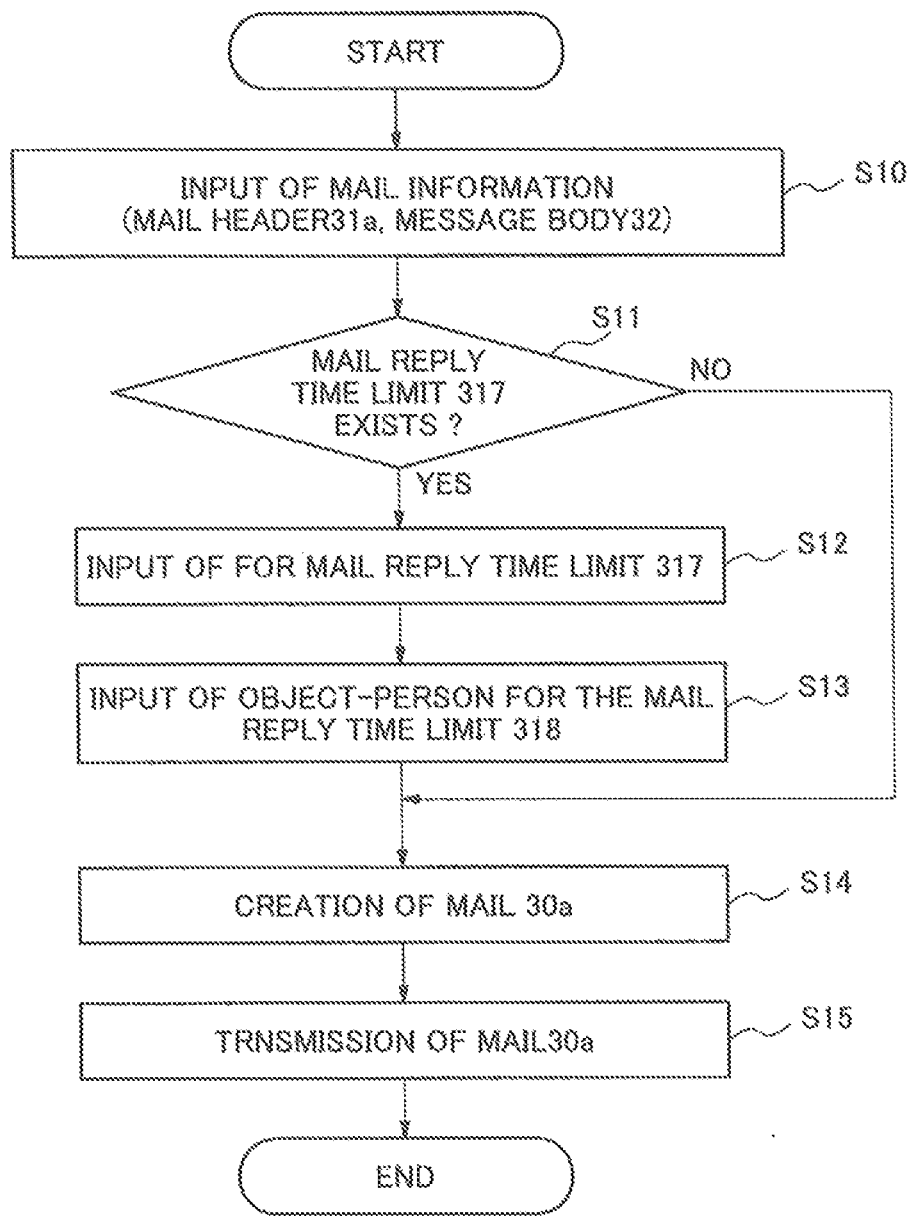
FIG. 12 is a flowchart showing an example of a mail transmission operation of a mail transmitter utilized in an e-mail system that applied the second embodiment of a mail receiver of the present invention.

FIG. 12 is a flowchart showing an example of a mail transmission operation of a mail transmitter utilized in the e-mail system that applied the second embodiment of the mail receiver of the present invention.

Figure 13:
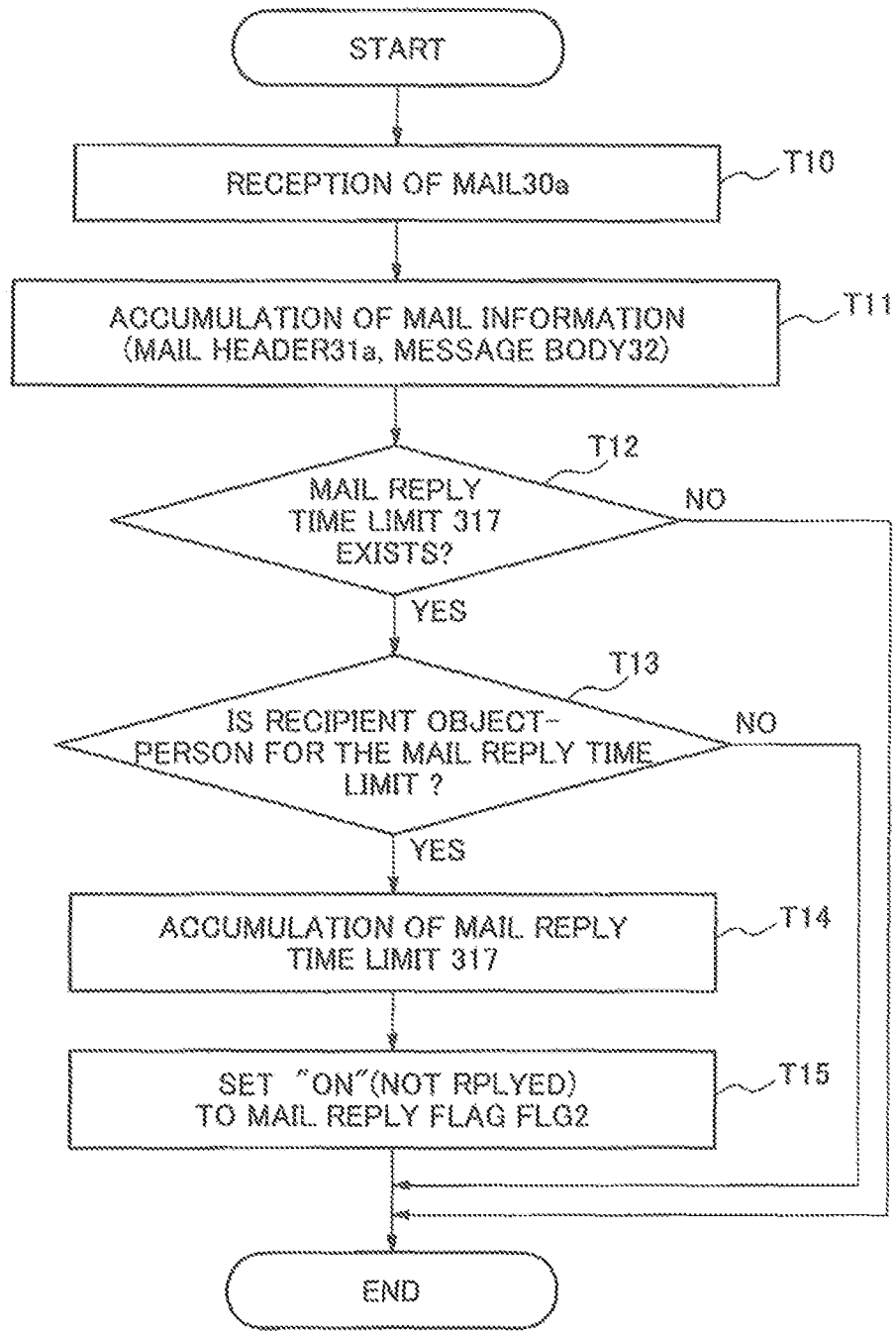
FIG. 13 is a flowchart showing an example of a mail receiving operation in the second embodiment of a mail receiver of the present invention.

FIG. 13 is a flowchart showing an example of a mail receiving operation in the second embodiment of the mail receiver of the present invention.

Figure 14:
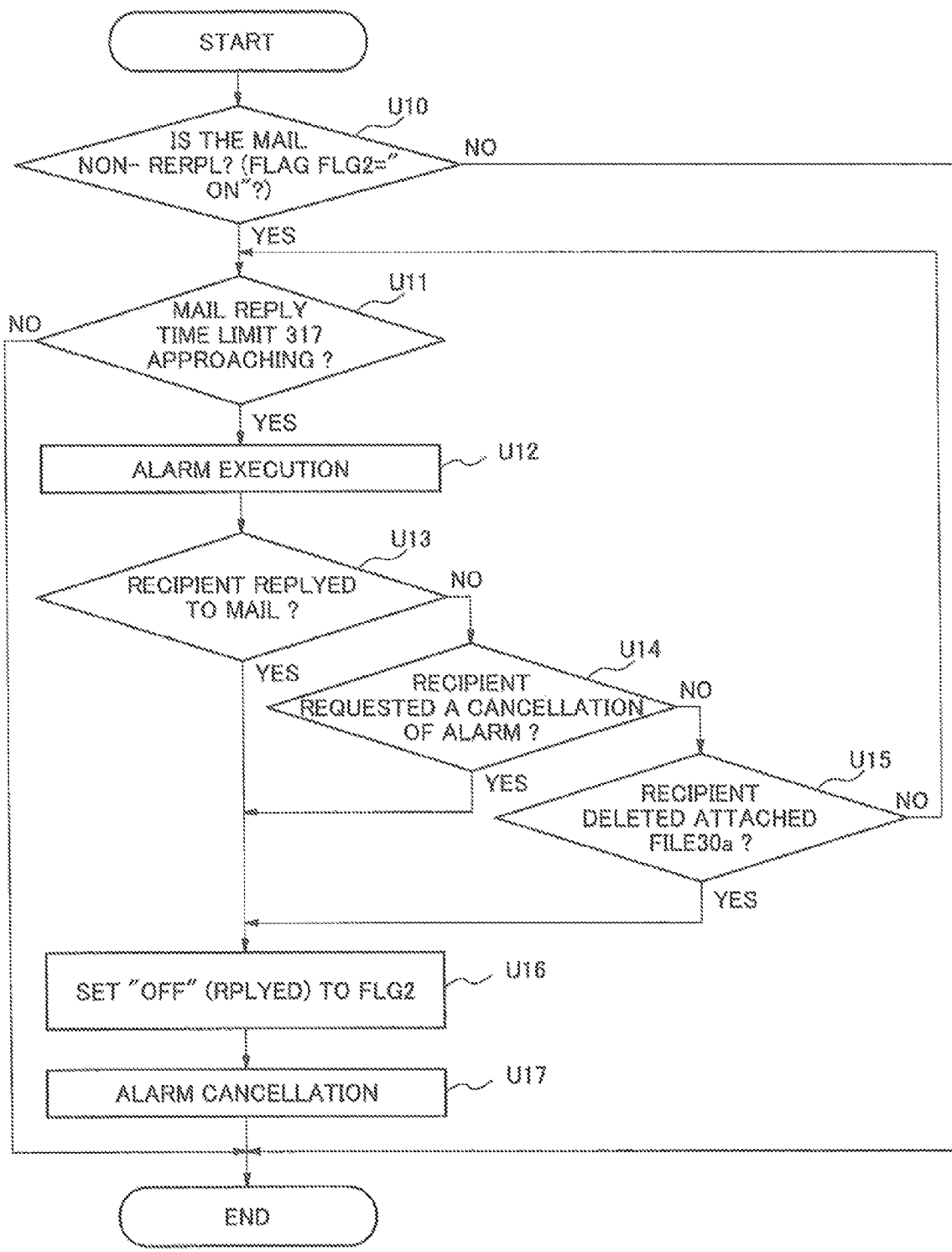
FIG. 14 is a flowchart showing an example of an alarm execution operation to in the second embodiment of a mail receiver of the present invention.

FIG. 14 is a flowchart showing an example of an alarm execution operation in the second embodiment of the mail receiver of the present invention.

First, an example of a mail transmission operation in the mail transmitter 10a shown in FIG. 10 will be described.

In the step S10 of FIG. 12, mail information from a sender is entered by the input unit 110. Then, the mail header creation unit 121 in a mail creation unit 120a creates mail header 31a, in which the mail header information (the transmission time and date 311, the title 312, the sender 313 and the address 314) shown in FIG. 11 of the mail information are set. In parallel with this, the message body creation unit 122 creates the message body 32 based on the message body information in the mail information entered to the input unit 110.

In the step S11 of FIG. 12, the mail transmitter examines whether the sender requests for setting the mail reply time limit 317. This can be performed, for example, by displaying a question whether or not to request a setting of the mail reply time limit 317 on the display (not shown), and by getting an answer from the input unit 110.

The flow goes to the step S12 when the result of the examination shows the request for setting of the mail reply time limit 317. The flow goes to the step S14 when the result of the examination does not show the request for setting of the mail reply time limit 317.

In the step S12 of FIG. 12, the creation unit of mail reply time limit 126 sets "year/month/date/time(second)" which is entered from the input unit 110 as the mail reply time limit 317.

In the step S13 of FIG. 12, the creation unit of object-person for the mail reply time limit 127 examines the address 314, and takes a transmission classification (All/To/CC/BCC) or an address entered from the input unit 110 as the object-person for the mail reply time limit 318 (the step S13) when a plurality of addresses are found (when sending the mail 30a to a plurality of persons). In other words, all the addresses included in the "To" part are set to the object-person for the mail reply time limit 318 when the "To" of transmission classification is assigned as the object-person for the mail reply time limit 318. When the address is assigned as the object-person for the mail reply time limit 318, the address is set as the object-person for the mail reply time limit 318

In the example of FIG. 11, as the mail reply time limit 317 and the object-person for the mail reply time limit 318, "2010/01/30 18:00" and "suzuki@NEC" are set respectively.

In the step S14 of FIG. 12, the mail enclosing unit 125 encloses each information created in each above-mentioned step and creates the mail 30a.

In the step S15 of FIG. 12, the mail transmission unit 130 transmits the mail 30a created by the mail enclosing unit 125 via network.

Next, an example of mail receiving operation in the mail receiver 20a will be described with reference to FIG. 10 and FIG. 13.

In the step T10 of FIG. 13, the mail receiving unit 210 in the mail receiver 20a receives the mail 30a transmitted from the mail transmitter 10a.

In the step T11 of FIG. 13, the mail receiver 210 connects the mail header 31a with the message body 32 in the received mail 30a each and stores it in the mail accumulation unit 220

In the step T12 of FIG. 13, the determination unit of object-person for the mail reply time limit 232 examines whether the mail reply time limit 317 is set in the mail header 31a of the received mail 30a. The flow goes to the step T13 when the result of the examination shows that the mail reply time limit 317 is set. The process is terminated when the result of the examination does not show that the mail reply time limit 317 is set.

In the step T13 of FIG. 13, the determination unit of object-person for the mail reply time limit 232 examines whether the recipient is the object-person of the mail reply time limit 317 with reference to the object-person for the mail reply time limit 318 in the mail header 31a. In other words, it is examined whether recipient's address is the address indicated by the object-person for the mail reply time limit 318. The flow goes to the step T14, when an examined result shows that a recipient is the object-person for the mail reply time limit 318. The process is terminated when the result of the examination does not show that a recipient is the object-person for the mail reply time limit 318.

In the step T14 of FIG. 13, the determination unit of object-person for the mail reply time limit 232 stores the mail reply time limit 317 in the mail header 31a to the time limit accumulation unit 240.

Then, the monitoring unit 250a sets "ON" (not replied) to the mail reply flag FLG2 in the step T15 of FIG. 13 and the process is terminated. The monitoring unit 250a is designed to set "OFF" (replied) to the flag FLG2 when the reply to the mail 30a, corresponding to the mail reply flag FLG2 which is set to "ON" (not-replied), is performed or the mail 30a is deleted by the recipient.

Next, an example of alarm execution operation in the mail receiver 20a with reference to FIG. 10 and FIG. 14 will be described.

In the step U10 of FIG. 14, the warning unit 260a refers to the mail reply flag FLG2 stored in the monitoring unit 250a first, and determines whether the flag FLG2 is OFF or not, in other words whether or not the mail 30a corresponding to the mail reply flag FLG2 was replied by a recipient. If the result of the determination shows that the mail reply flag FLG2 is OFF, in other words the mail 30a was replied, the warning unit 260a does not execute any process and the process is terminated. If the result of the determination shows that the mail reply flag FLG2 is ON, the flow continues to the step U11.

In the step U11 in FIG. 14, the warning unit 260a refers to the mail reply time limit 317 stored in the time limit accumulation unit 240, and determines whether or not the reply time limit of the mail 30a is approaching.

If the result of the determination shows that the reply time limit is approaching, the flow continues to the step U13. If the result of the determination does not show that the reply time limit to the mail 30a is approaching, in other words, there is time to spare for the reply time limit, the warning unit 260a terminates the process.

In the step U12 of FIG. 14, the warning unit 260a executes an alarm operation with the same manner that the warning unit 260 shown in FIG. 2 did in the step U3 in FIG. 7 and informs the recipient that the reply time limit to the mail 30a is approaching. After that, the process continues to the step U13.

In the step U13 of FIG. 14, the monitoring unit 250a examines whether the reply to the mail 30a was performed by the recipient. If the result of the examination shows that the recipient replied, the flow continues to the step U16. If the result of the examination does not show that the recipient replied, the flow continues to the step U14. It is examined as follows whether the reply to the mail 30a was performed by the recipient. The examination of the reply to the mail 30 by recipient is carried out by examining whether the mail receiver 20a performs the reply process to the mail 30a, according to the instruction from a input means (not shown) operated by the recipient. The monitoring unit 250a examines the existence of the execution of reply process to the mail 30a by the mail receiver 20a.

In the step U14 of FIG. 14, the monitoring unit 250 monitors the alarm cancellation request from the input mean by operating the input means by the recipient and examines whether or not the alarm cancellation request exists. If the result shows that the alarm cancellation request is accepted, the step continues to the step U16. If the result does not show that the alarm cancellation request is accepted, the step continues to the step U15.

In the step U15 of FIG. 14, the monitoring unit 250a monitors the deletion request of the mail 30a from the input means by operating the input means by the recipient and examines whether or not the deletion request of the mail 30a exists. If the result of the examination shows that the deletion request of the mail 30a is accepted, the mail 30a is deleted from the mail accumulation unit 220 and the mail reply time limit 317 corresponding to the mail 30a in the time limit accumulation unit is deleted. Then the flow continues to the step U16. If the result does not show that the deletion request of the mail 30a is accepted, the flow goes back to the step U11.

In the step U16 of FIG. 14, the monitoring unit 250a sets "OFF (replied)" to the mail reply flag FLG2.

In the step U17 of FIG. 14, the warning unit 260a cancels the alarm executed in the step U12 and terminates the process.

As described above, the warning unit 260a continues to execute the above mentioned steps U11 and U12 repeatedly and keeps informing the recipient periodically that the mail reply time limit is approaching when the recipient does not take any actions of replying to the mail 30a, requesting for canceling the alarm, and deleting the mail 30a.

As described above, in the second embodiment of the mail receiver of the present invention, it is possible to prevent losing the validity of the mail since the mail which the reply time limit is approaching can be warned to the recipient certainly. And the warning can be notified when the mail reply time limit is approaching and only when assigned as the object-person for the mail reply time limit in the received mail. On this account, the warning about the mail reply time limit will not be notified when not designated as the object-person for the mail reply time limit. On this account, the recipient without designation as the object-person for the mail reply time limit can reduce the burden such as receiving the warning about the mail reply time limit and coping with this.

Additionally, the monitoring unit 250a and the warning unit 260a in the mail receiver 20a shown in FIG. 10 can be provided on the network server 40 shown in FIG. 8 like the monitoring unit 250 and the warning unit 260 in FIG. 2.

The Third Embodiment

At last, the third embodiment of the mail receiver of the present invention will be described.

Figure 15:
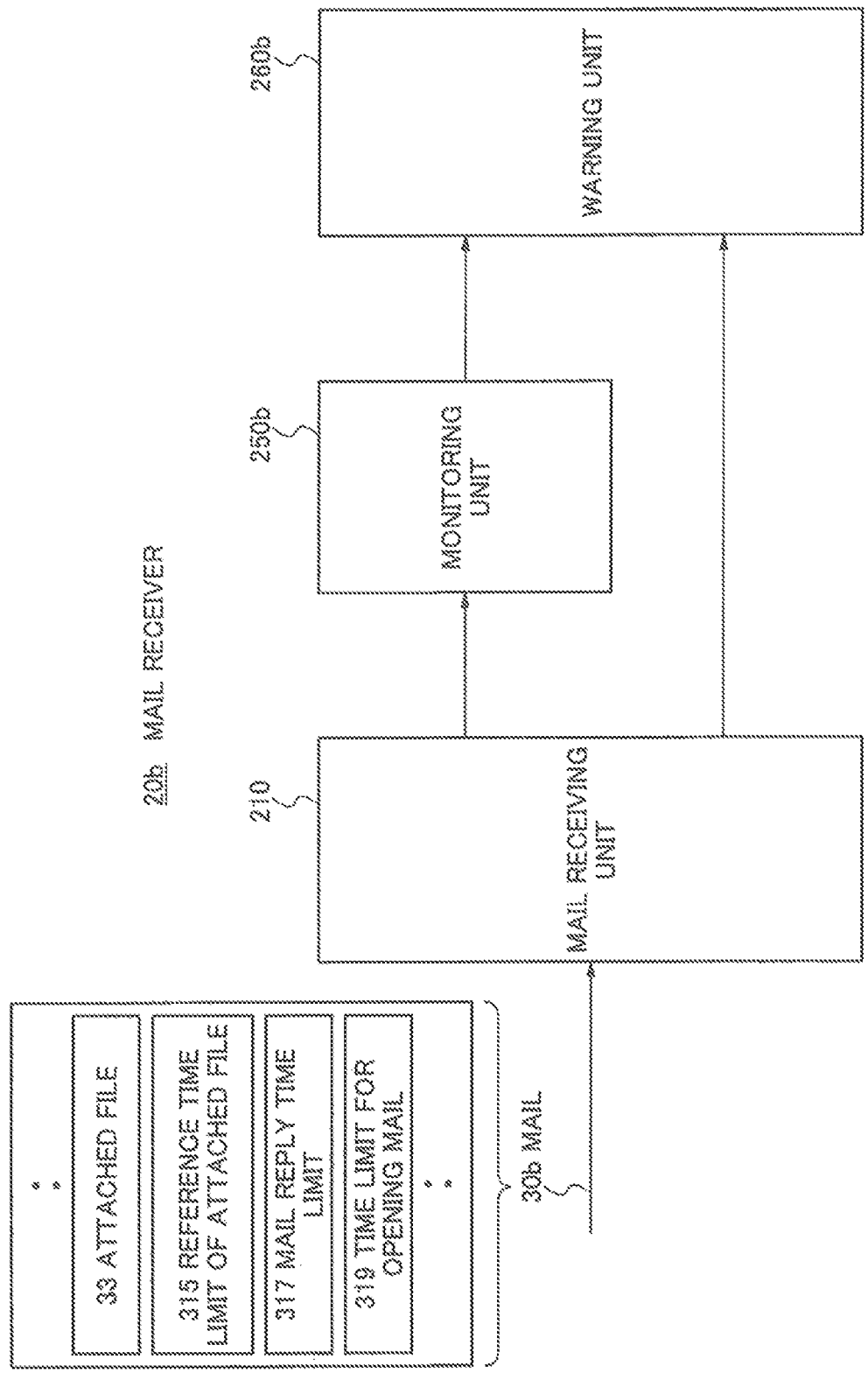
FIG. 15 shows the third embodiment of a mail receiver of the present invention.

FIG. 15 shows the third embodiment of a mail receiver of the present invention.

A mail receiver 20b shown in FIG. 15 includes the mail receiving unit 210, a monitoring unit 250b and a warning unit 260b.

The mail receiving unit 210 receives a mail 30b to which the attached file 33 and the reference time limit of attached file 315, the mail reply time limit 317 and the time limit for opening mail 319 are added. The monitoring unit 250b monitors whether the attached file 33 was referred to by the recipient (user), a reply to the mail 30b was performed by the recipient and the mail 30b was opened or not. The warning unit 260b warns the recipient of one which the reference time limit is approaching among the non-referenced attached file. The warning unit 260b also warns the recipient of one which the reply time limit is approaching among the non-replied mail. The warning unit 260b also warns the recipient of one which the time limit for opening is approaching among the non-opened mail.

An example of detail configuration and operation of the mail receiver 20b in the third embodiment shown in FIG. 15 will now be described with reference to an e-mail system 1b shown in FIG. 16 that applied the mail receiver 20b.

Figure 16:
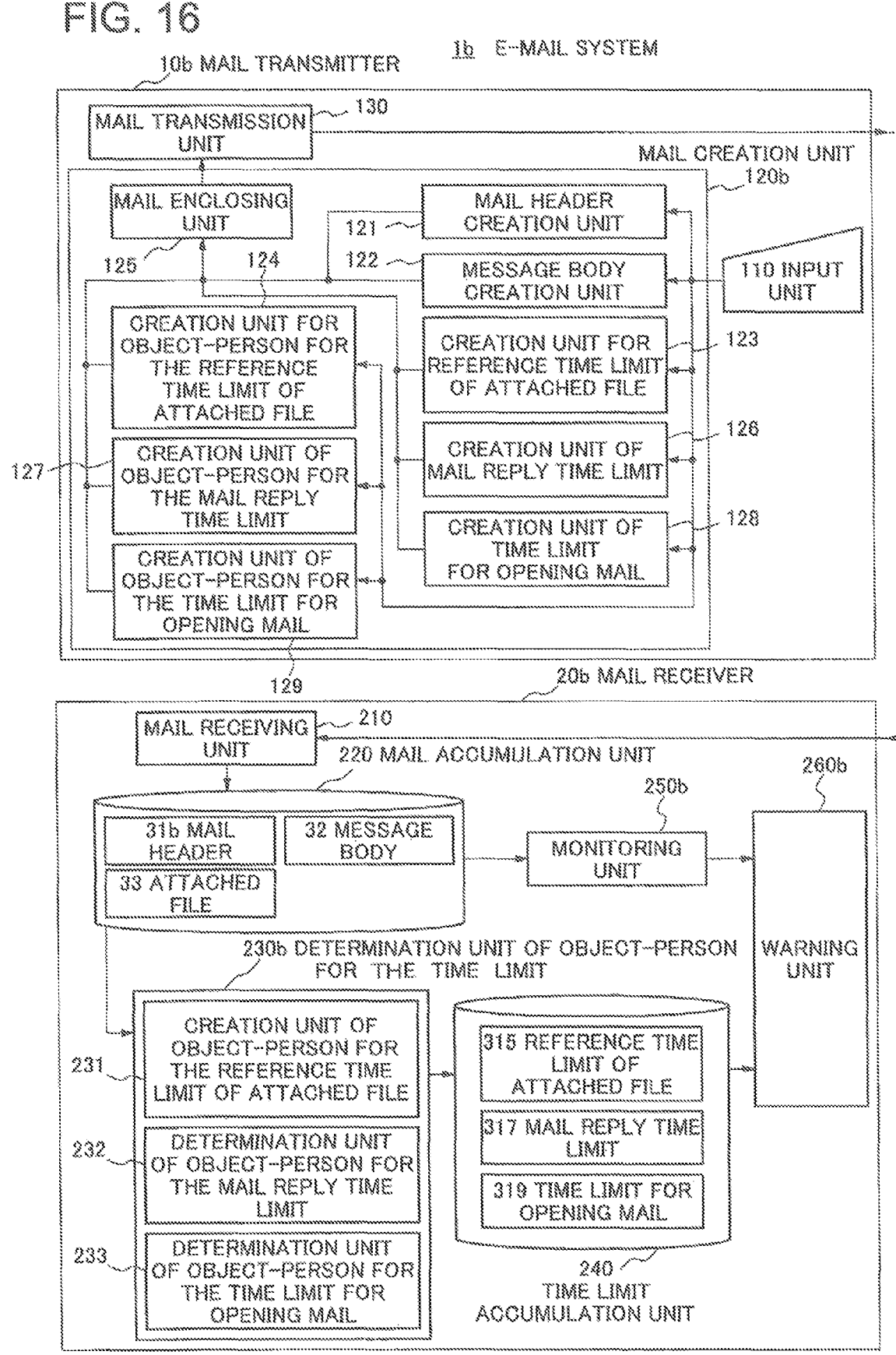
FIG. 16 is a block diagram showing a configuration example of an e-mail system that applied a mail receiver shown in FIG. 15.

The e-mail system 1b shown in FIG. 16 includes a mail transmitter 10b and a mail receiver 20b.

The mail transmitter 10b includes a input unit 110, a mail creation unit 120b and a mail transmission unit 130. The input unit 110 and the mail transmission unit 130 are same as that of the first and the second embodiment. The mail creation unit 120b has the creation unit for reference time limit of attached file 123 and the creation unit for object-person for the reference time limit of attached file 124 shown in FIG. 2 of the first embodiment. The mail creation unit 120b also has the creation unit of mail reply time limit 126 and the creation unit of object-person for the mail reply time limit 127 shown in FIG. 10 explained in the second embodiment. The mail creation unit 120b of the mail transmitter 10b further has a mail creation unit of time limit for opening mail 128 and a creation unit of object-person for the time limit for opening mail 129.

The mail receiver 20b includes the mail receiver 210, the mail accumulation unit 220, a determination unit of object-person for the time limit 230b, the time limit accumulation unit 240, the monitoring unit 250 and the warning unit 260. The mail receiver 210 and the mail accumulation unit 220 are same as the first embodiment. The determination unit of object-person for the time limit 230b has a determination unit of object-person for the time limit for opening mail 233 in addition to the determination unit of object-person for the reference time limit of attached file 231 shown in FIG. 2 of the first embodiment and the determination unit of object-person for the mail reply time limit 232 shown in FIG. 10 of the second embodiment.

The time limit accumulation unit 240 further accumulates a time limit for opening mail 319 in addition to the reference time limit of attached file 315 shown in FIG. 2 of the first embodiment and the mail reply time limit 317 shown in FIG. 10 of the second embodiment.

The monitoring unit 250*b* monitors whether or not the attached file 33 was referred to by the recipient (user), whether or not a reply to the mail 30*b* was performed by the recipient and whether or not the mail 30*b* was opened.

The warning unit 260*b* warns the recipient of one which the reference time limit is approaching among the non-referenced attached file. The warning unit 260*b* also warns a recipient of one which the reply time limit is approaching among the non-replied mail. The warning unit 260*b* also warns the recipient of one which the time limit for opening is approaching among the non-opened mail.

Figure 17:
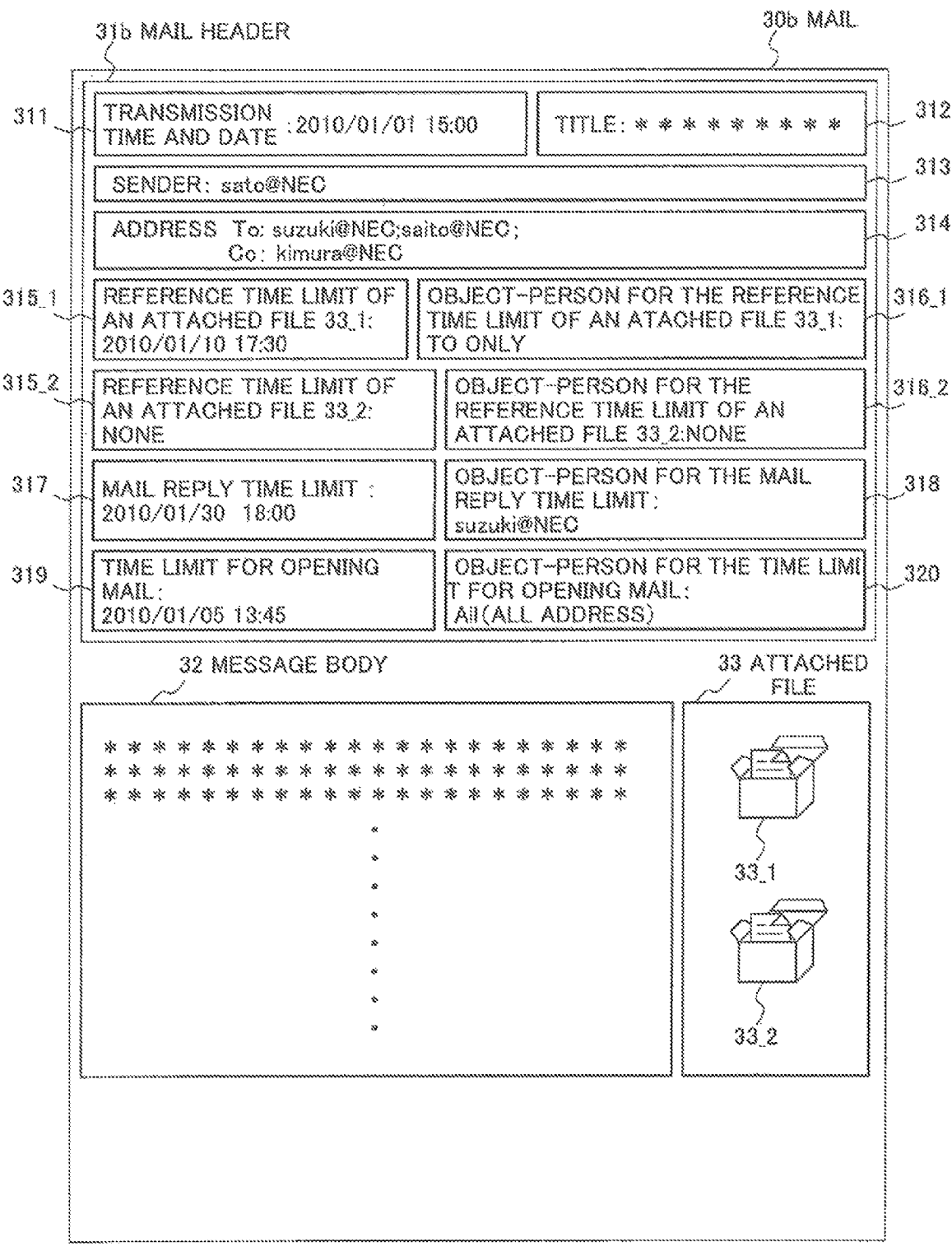
FIG. 17 shows a configuration example of a mail transmitted and received in an e-mail system.

FIG. 17 shows a configuration example of a mail transmitted and received in the e-mail system 1*b*. The mail 30*b* is composed by adding the mail reply time limit 317 and the object-person for the mail reply time limit 318 of the mail 30*a* shown in FIG. 11 of the second embodiment and further adding the time limit for opening mail 319 and the object-person for the time limit for opening mail 320 to the mail 30 shown in FIG. 3 of the first embodiment.

Here, the mail creation unit of time limit for opening mail 128 and the creation unit of object-person for the time limit for opening mail 129 of the mail transmitter 10*b* shown in FIG. 16 are for producing the time limit for opening mail 319 and the information of object-person 320 (hereinafter called the object-person for the time limit for opening mail) shown in FIG. 17 respectively. The determination unit of object-person for the time limit for opening mail 233 in the mail receiver 20*b* shown in FIG. 16 is for accumulating the time limit for opening mail 319 in the time limit accumulation unit 240 when the receiver is determined as the object-person of the time limit for opening mail 319 based on the object-person for the time limit for opening mail 320.

[Example of Operation]

Next, an example of operation of the third embodiment of the mail receiver of the present invention will be described. First, an example of mail transmission operation in the mail transmitter 10*b* shown in FIG. 16 will be described with reference to FIG. 18. Next, an example of alarm execution operation and a mail receiving operation in the mail receiver 20*b* will be described with reference to FIGS. 19 and 20 respectively.

Figure 18:
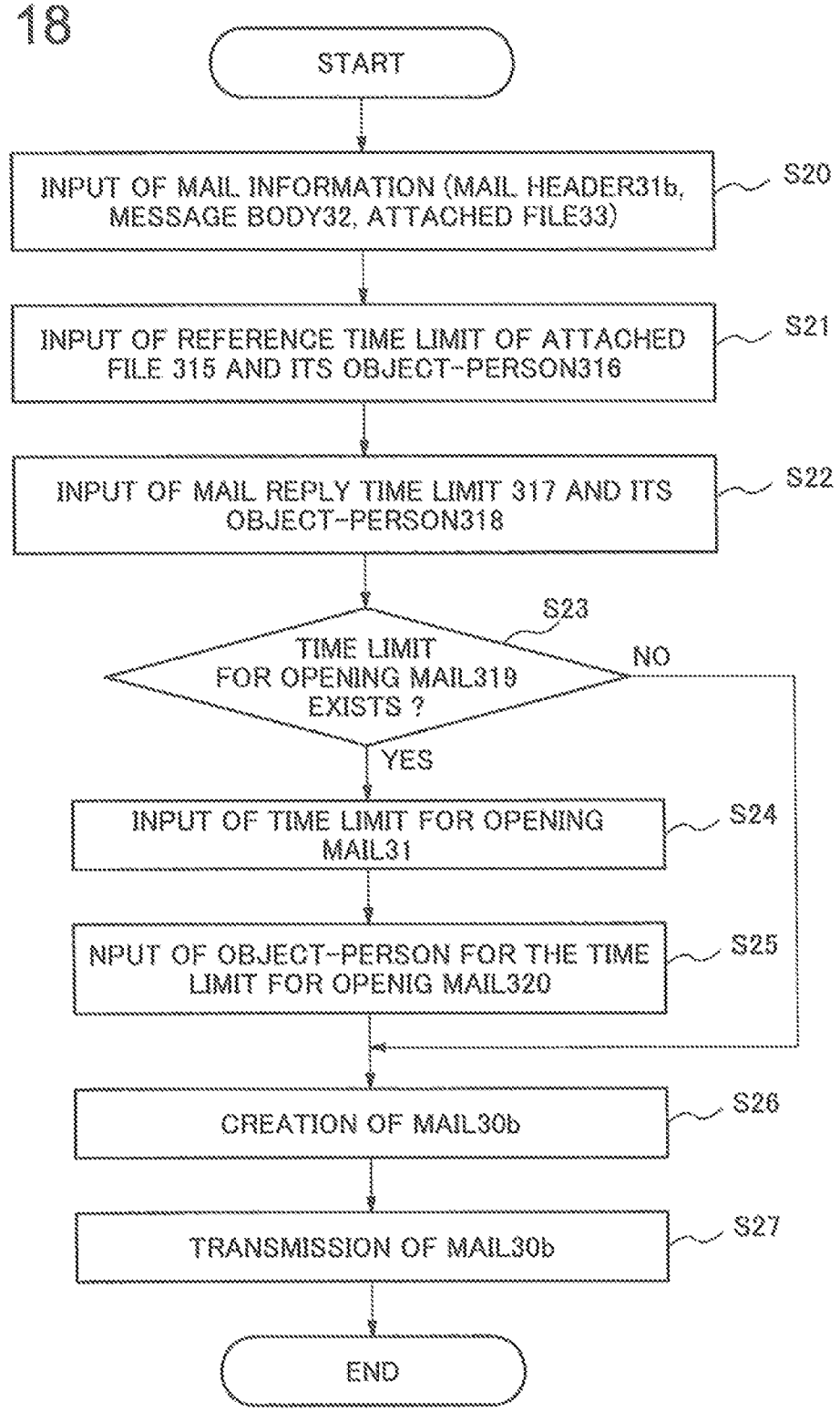
FIG. 18 is a flowchart showing an example of a mail transmission operation of a mail transmitter utilized in an e-mail system that applied the third embodiment of a mail receiver of the present invention.

FIG. 18 is a flowchart showing an example of a mail transmission operation of the mail transmitter utilized in an e-mail system that applied the third embodiment of a mail receiver of the present invention.

Figure 19:
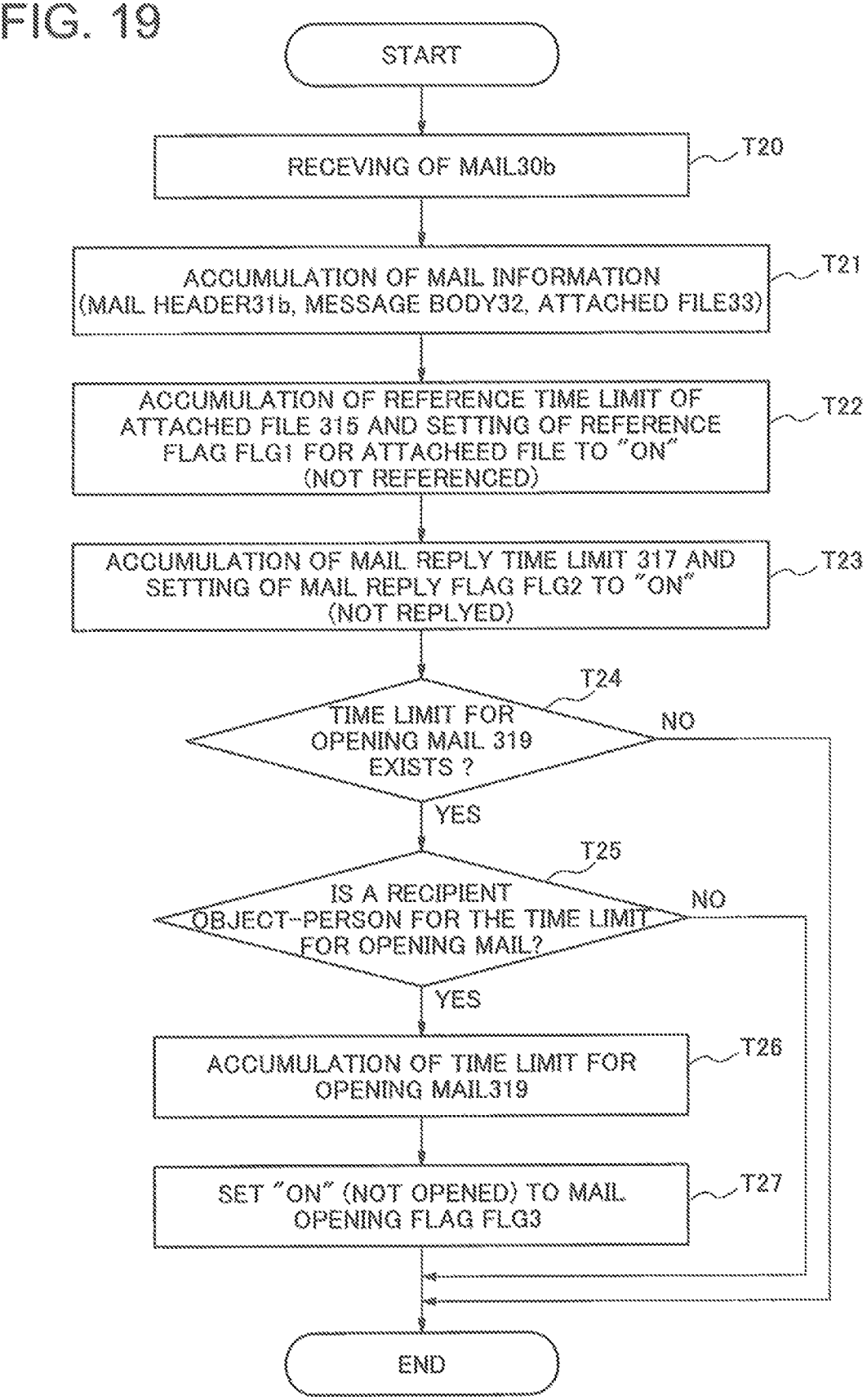
FIG. 19 is a flowchart showing an example of a mail receiving operation in the third embodiment of a mail receiver of the present invention.

FIG. 19 is a flowchart showing an example of a mail receiving operation in the third embodiment of a mail receiver of the present invention.

Figure 20:
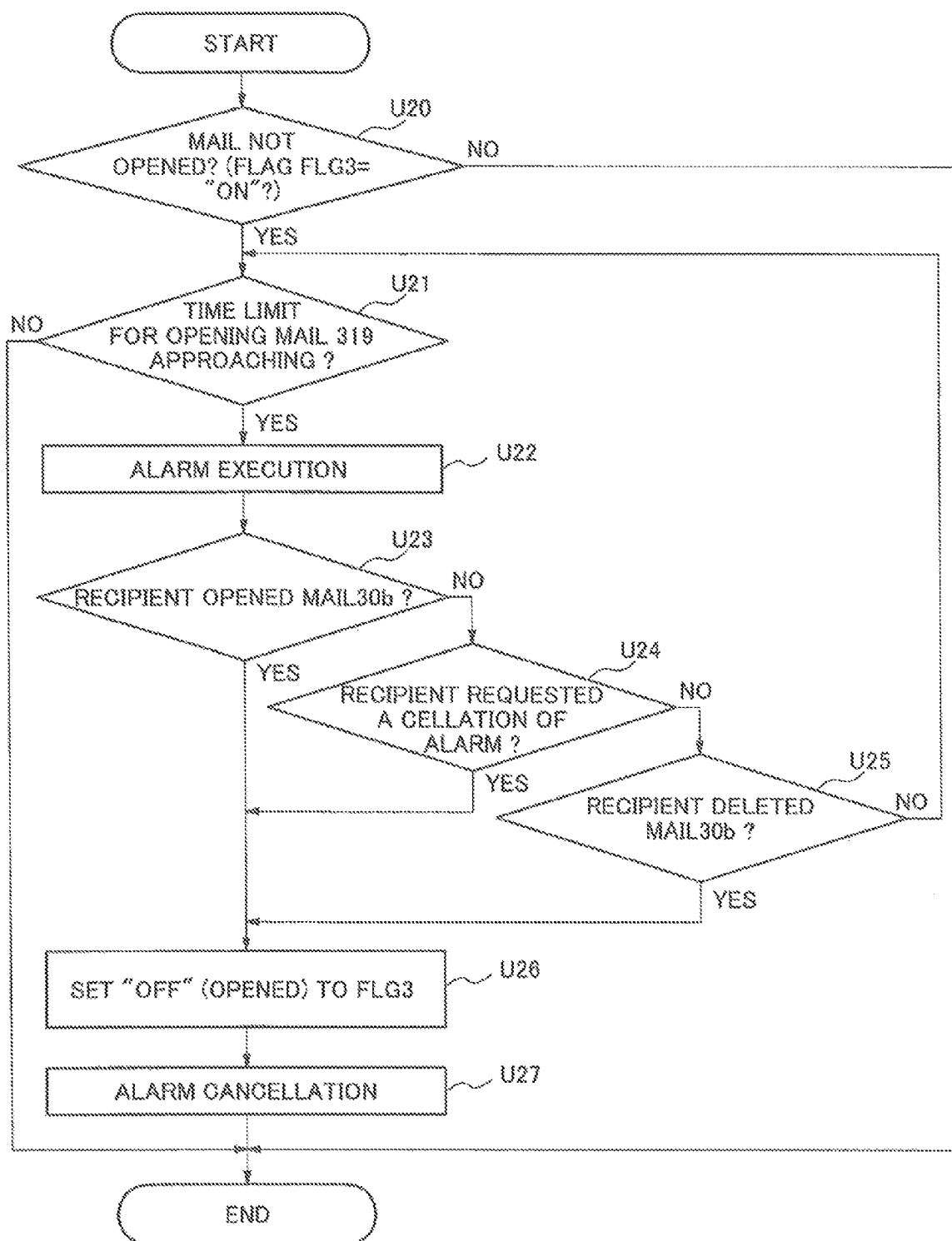
FIG. 20 is a flowchart showing an example of an alarm execution operation in the third embodiment of a mail receiver of the present invention.

FIG. 20 is a flowchart showing an example of an alarm execution operation in the third embodiment of a mail receiver of the present invention.

First, an example of a mail transmission operation in the mail transmitter 10*b* shown in FIG. 16 will be described.

In the step S20 of FIG. 18, mail information from a sender is entered by the input unit 110. Then, the mail header creation unit 121 in the mail creation unit 120*b* creates mail header 31, in which the mail header information (the transmission time and date 311, the title 312, the sender 313 and the address 314) shown in FIG. 17 of the mail information are set, and the attached file information is inserted into the mail header 31*b* (not shown) when the mail information has any attached file information. In parallel with this, the message body creation unit 122 in the mail creation unit 120*b* creates the message body 32 based on the message body information in the mail information entered by the input unit 110.

In the step S21 of FIG. 18, the creation unit for reference time limit of attached file 123 and the creation unit for object-person for the reference time limit of attached file 124 perform the step S2 to S5 of FIG. 5 and create the reference time limit of attached file 315 and the object-person for the reference time limit of attached file 316 respectively. However, the wording "continue to the step 6" in the step S2 to S5 shown in FIG. 5 is switched into "continues to the step 22".

In the step S22 of FIG. 18, the creation unit of mail reply time limit 126 and the creation unit of object-person for the mail reply time limit 127 perform the step S11 to S13 shown in FIG. 12 and create the mail reply time limit 317 and the object-person for the mail reply time limit 318 respectively. However, the wording "continue to the step 14" in the step S11 to S13 shown in FIG. 12 is switched to "continue to the step 23".

In the step S23 of FIG. 18, the mail transmitter 10*b* examines whether the sender requests for setting the time limit for opening mail 319. This can be performed, for example, by displaying a question whether or not to request a setting of the time limit for opening mail 319 on the display (not shown), and by getting an answer of it from the input unit 110.

The flow goes to the step S24 when the result of the examination shows the request for setting of the time limit for opening mail 319. The flow goes to the step S26 when the result of the examination does not show the request for setting of the time limit for opening mail 319.

In the step S24 of FIG. 18, the creation unit of time limit for opening mail 128 sets "year/month/date/time(second), which is entered from the input unit 110, as the time limit for opening mail 319.

In the step S25 of FIG. 18, the creation unit of for opening of mail 129 examines the address 314, and takes transmission classification (All/To/CC/BCC) or an address entered from the input unit 110 as the object-person for the time limit for opening mail 320 when a plurality of addresses are found (when sending the mail 30*a* to a plurality of persons).

In the example shown in FIG. 17, as the time limit for opening mail 319 and the object-person for the time limit for opening mail 320, "2010/01/05 13:45" and "transmission classification All(ALL ADDRESS)" are set respectively.

In the step S26 of FIG. 18, the mail enclosing unit 125 encloses each information created in each above-mentioned step and creates the mail 30*b*.

In the step S26 of FIG. 18, the mail transmission unit 130 transmits the mail 30*b* created by the mail enclosing unit 125 via network.

Next, an example of mail receiving operation in the mail receiver 20*b* will be described with reference to FIG. 16 and FIG. 19.

In the step T20 of FIG. 19, the mail receiving unit 210 in the mail receiver 20*b* receives the mail 30*b* transmitted from the mail transmitter 10*b*.

In the step T21 of FIG. 19, the mail receiver 210 connects the mail header 31*a*, the message body 32, and the attached file 33 in the received mail 30*a* each and stores it in the mail accumulation unit 220

In the step 22 (T22) of FIG. 19, the determination unit of object-person for the reference time limit of attached file 231 and the monitoring unit 250b perform the step T3 to T6 shown in FIG. 6, store the reference time limit of attached file 315 in the time limit accumulation unit 240 and set "ON (not-referenced)" to the attached file reference flag FLG1. However, the wording "terminate the process" in the step T3 to T6 shown in FIG. 6 is switched to "continue to the step 23 (T23)".

In the step T23 of FIG. 19, the determination unit of object-person for the mail reply time limit 232 and the monitoring unit 250b perform the step T12 to T15 shown in FIG. 13, store the mail reply time limit 317 in the time limit accumulation unit 240 and set "ON (not-referred)" to the mail reply flag FLG2. However, the wording "terminate the process" in the step T12 to T15 shown in FIG. 13 is switched to "continue to the step T24".

In the step T24 of FIG. 19, the determination unit of object-person for the time limit for opening mail 233 examines whether the time limit for opening mail 319 is set in the mail header 31b of the received mail 30b. The flow goes to the step T25 when the result of the examination shows that the time limit for opening mail 319 is set. The process is terminated when the result of the examination does not show that the time limit for opening mail 319 is set.

In the step T25 of FIG. 19, the determination unit of object-person for the time limit for opening mail 233 examines whether the recipient is the object-person for the time limit for opening mail 319 with reference to the object-person for the time limit for opening mail 320 in the mail header 31b. In other words, it is examined whether recipient's address is the address indicated by the object-person for the time limit for opening mail 320. The flow goes to the step T26, when the examined result shows that a recipient's address is the object-person for the time limit for opening mail 320. The process is terminated when the result of the examination does not show that the recipient's address is the object-person for the time limit for opening mail 320. In this example, the object-person for the time limit for opening mail 320 in the mail header 31b of the mail 30b shown in FIG. 17 is "All", so all the address indicated with the address 314 correspond to the object-person for the time limit for opening mail 320.

In the step T26 of FIG. 19, the determination unit of object-person for the time limit for opening mail 233 stores the time limit for opening mail 319 in the mail header 31b to the time limit accumulation unit 240.

In the step T27 of FIG. 19, the monitoring unit 250b sets "ON (not-opened)" to the mail opening flag FLG3 stored inside itself and the process is terminated. The monitoring unit 250b is designed to set "OFF (opened)" to the flag FLG3 when the mail 30b corresponding to the mail reply flag FLG3 which is set "ON (not opened)" to is opened or deleted by the recipient.

Next, an example of alarm execution operation in the mail receiver 20b with reference to FIG. 16 and FIG. 20 will be described. Since the operation in reference to the reference time limit of attached file 315 is same as the operation explained in FIG. 7 of the first embodiment, the explanation is omitted. Since the operation in reference to the mail reply time limit 317 is also same as the operation explained in FIG. 14 of the second embodiment, the explanation is omitted. Thus, hereinafter only the operation in reference to the time limit for opening mail 319 will be described.

In the step U20 of FIG. 20, the warning unit 260b refers to the mail opening flag FLG3 stored in the monitoring unit 250b first, and determines whether this flag FLG3 is OFF or not, in other words whether the mail 30b corresponding to the mail opening flag FLG3 was opened by the recipient or not. If the result of the determination shows that the mail opening flag FLG3 is OFF, in other words the mail 30b was opened, the warning unit 260b does not execute any process and the process is terminated. If the result of the determination shows that the mail opening flag FLG3 is ON, the flow continues to the step U21.

In the step U21 in FIG. 20, the warning unit 260b refers to the time limit for opening mail 319 stored in the time limit accumulation unit 240, and determines whether the time limit for opening of the mail 30b is approaching or not.

If the result of the determination shows that the time limit for opening of the mail 30b is approaching, the flow continues to the step U22. If the result of the determination does not show that the time limit for opening of the mail 30b is approaching, in other words there is time to spare for the reference time limit, the warning unit 260b does not execute any process and the process is terminated.

In the step U22 of FIG. 20, the warning unit 260b executes an alarm operation same as the operation which the warning unit 260 executes in the step U3 of FIG. 7 and informs the recipient that the time limit of opening of mail 30b is approaching. After that, the process continues to the step U23.

In the step U23 of FIG. 20, the monitoring unit 250b examines whether the mail 30b was opened by the recipient. If the result of the examination shows that the recipient opened, the flow continues to U26. If the result of the examination does not show that the recipient opened, the flow continues to U24. It is examined as follows whether the mail 30b was opened by the recipient. The examination of the opening of the mail 30b by recipient is carried out by examining whether the mail receiver 20b took the opening process for the mail 30b or not according to the instruction from a input means (not shown) operated by the recipient. The monitoring unit 250b examines the existence of the execution of opening process to the mail 30b by the mail receiver.

In the step U24 of FIG. 20, the monitoring unit 250b monitors the alarm cancellation request from the input means operated by the recipient and examines the existence of the alarm cancellation request. If the result of the examination shows that the alarm cancellation request is accepted, the flow continues to U26. If the result of the examination does not show that the alarm cancellation request is accepted, the flow continues to the step U25.

In the step U25 of FIG. 20, the monitoring unit 250b monitors the deletion request of the mail 30b from the input means operated by the recipient and examines the existence of the deletion request of the mail 30b.

If the result of the examination shows that the deletion request of the mail 30b is accepted, the mail 30b is deleted from the mail accumulation unit and the reference time limit of attached file 315, the mail reply time limit 317, and the time limit for opening mail 319 in the time limit accumulation unit corresponding to the mail 30b are deleted. Then the flow continues to the step U26. If the result of the examination does not show that the deletion request of the mail 30b is accepted, the flow goes back to the step U21. In the step U26 of FIG. 20, the monitoring unit 250b sets "OFF (opened)" to the mail opening flag FLG3.

In the step U27 of FIG. 20, the warning unit 260b cancels the alarm executed in the step U22, and the process is terminated.

As described above, the warning unit 260b executes the above mentioned steps U21 and U22 repeatedly and keeps informing the recipient periodically that the time limit for opening mail is approaching when the recipient does not take any actions of opening the mail 30b, requesting for canceling the alarm, and deleting the mail 30b.

As described above, according to the mail receiving unit of the present invention, the monitoring unit monitors whether the attached file to the received mail is referred to or not, the reply to the mail is performed by the recipient or not, and the mail is opened or not. And the warning unit warns the recipient of one which the reference time limit of attached file is approaching. And the mail of which the reply time limit is approaching is warned to the recipient. Further, the mail of which the time limit for opening is approaching is warned to the recipient.

Consequently, there is not a possible risk to overlook an attached file added a received mail and it can be prevented that validity of an attached file is lost. There is not a possible risk to leave a mail, which needs to be opened, without opening too. Consequently, it can be prevented that validity of an attached file is lost. Further, it can manage the time limits regarding the received mails more certainly.

Additionally, the monitoring unit 250*b* and the warning unit 260*b* in the mail receiver 20*b* shown in FIG. 16 can be provided on the network server 40 shown in FIG. 8 same as the monitoring unit 250 and the warning unit 260 shown in FIG. 2.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mail receiver being a computer implemented apparatus having
   a processor, and
   a memory storing instructions to be executed by the processor comprising:
   a mail receiving means for receiving a mail in which an attached file and a reference time limit, being a limit to refer to the attached file, may be appended and an object-person information for the reference time limit is included;
   a monitoring means for monitoring whether the attached file was referred to by a user; and
   a warning means for warning the user to refer to the attached file if the attached file is not referred to and the reference time limit of the attached file is approaching
   wherein the monitoring means performs the monitoring and the warning means performs the warning only when information of the user is included in the object-person information.

2. A mail receiver being a computer implemented apparatus, having:
   a processor, and
   a memory storing instructions be executed by the processor comprising:
   a mail receiving means for receiving a mail in which a reply time limit, being a limit to send a reply, may be appended and an object-person information for the rely time limit is included;
   a monitoring means for monitoring whether a reply to the received mail is sent by a user;
   a warning means for warning the user to send the reply to the received mail if the reply is not sent and the reply time limit of the reply is approaching
   wherein the monitoring means performs the monitoring and the warning means performs the warning only when information of the user is included in the object-person information.

3. The mail receiver according to claim 1, wherein the mail includes a time limit for opening,
   the monitoring means for monitoring whether the received mail was opened by the user, and
   the warning means for warning the user to open the received mail if the received mail is not opened and the time limit for opening the received mail is approaching.

4. The mail receiver according to claim 3, wherein the mail includes object-person information for the reference time limit and object-person information for the time limit for opening, and
   the monitoring means for monitoring:
   whether the attached file was referred to by the user when information of the user is included in the object-person information for the reference time limit, and
   whether the received mail was opened by the user when information of the user is included in the object-person information for the time limit for opening,
   the warning means for warning:
   the user to refer to the attached file if the attached file is not referred to but the reference time limit of the attached filed is approaching when information of the user is included in the object-person information for the reference time limit, and
   the user to open the received mail if the received mail is not opened but the time limit for opening of the received mail is approaching when the information of the user is included in the object-person information for the time limit for opening.

5. The mail receiver according to claim 2, wherein the mail includes a time limit for opening,
   the monitoring means for monitoring whether the received mail was opened by the user, and
   the warning means for warning the user to open the received mail if the received mail is not opened but the time limit for opening the received mail is approaching.

6. The mail receiver according to claim 5, wherein the mail includes object-person information for the reply time limit and object-person information for the time limit for opening, and
   the monitoring means for monitoring:
   whether a reply to the received mail is sent by the user when information of the user is included in the object-person information for the reply time limit, and
   whether the received mail was opened by the user when information of the user is included in the object-person information for the time limit for opening,
   the warning means for warning:
   the user to send the reply to the received mail if the reply is not sent but the reply time limit of the reply is approaching when information of the user is included in the object-person information for the reply time limit, and
   the user to open the received mail if the received mail is not opened but the time limit for opening of the received mail is approaching when the information of the user is included in the object-person information for the time limit for opening.

7. The mail receiver according to claim 1, wherein the mail includes a reply time limit being a limit to send a reply,
   the monitoring means for monitoring whether the reply to the received mail is sent by the user, and
   the warning means for warning the user to send the reply to the received mail if the reply is not sent but the reply time limit of the reply is approaching among.

8. The mail receiver according to claim 7, wherein the mail includes object-person information for the reference time limit and object-person information for the reply time limit, and the monitoring means for monitoring:
whether the attached file was referred to by the user when information of the user is included in the object-person information for the reference time limit, and
whether the reply to the received mail is sent by the user when information of the user is included in the object-person information for the reply time limit,
the warning means for warning:
the user to refer to the attached file if the attached file is not referred to but the reference time limit of the attached file is approaching when information of the user is included in the object-person information for the reference time limit, and
the user to send reply to the received mail if the reply is not sent but the reply time limit of the reply is approaching when information of the user is included in the object-person information for the reply time limit.

9. The mail receiver according to claim 7, wherein the mail includes a time limit for opening,
the monitoring means for monitoring whether the received mail was opened by the user, and
the warning means for warning the user to open the received mail if the received mail is not open but the time limit for opening of the received mail is approaching.

10. The mail receiver according to claim 9, wherein the mail includes object-person information for the reference time limit, object-person information for the reply time limit and object-person information for the time limit for opening, and the monitoring means for monitoring:
whether the attached file was referred to by the user when information of the user is included in the object-person information for the reference time limit,
whether the reply to the received mail is sent by the user when information of the user is included in the object-person information for the reply time limit, and
whether the received mail was opened by the user when information of the user is included in the object-person information for the time limit for opening,
the warning means for warning:
the user to refer to the attached file if the attached file is not referred to but the reference time limit of the attached file is approaching when information of the user is included in the object-person information for the reference time limit,
the user to send the reply to the received mail if the reply is not sent but the reply time limit of the reply is approaching when information of the user is included in the object-person information for the reply time limit, and
the user to open the received mail if the received mail is not opened but the time limit for opening of the received mail is approaching when information of the user is included in the object-person information for the time limit for opening.

11. The mail receiver according to claim 1, wherein the warning means for notifying the user of an alarm as the warning.

12. The mail receiver according to claim 1, wherein the warning means for displaying the mail to which the attached file is appended and the reference time limit is approaching.

13. The mail receiver according to claim 1, wherein the warning means for starting a mailer application autonomously as the warning.

14. The mail receiver according to claim 1, wherein the warning means for cancelling the warning in response to a demand from the user.

15. A network server being a computer, comprising:
a storage means for storing an attached file and a reference time limit appended to a mail which a mail receiver received; and
a monitoring means for monitoring whether a stored attached file was referred to by a user who uses the mail receiver; and
a warning means for directing the mail receiver to warn the user to refer to the attached file if the attached file is not referred to but the reference time limit of the attached file is approaching
wherein the mail receiver is one according to any one of claims 1-2 and 3-14.

* * * * *